United States Patent [19]
Teraoka et al.

[11] Patent Number: 5,458,547
[45] Date of Patent: Oct. 17, 1995

[54] DIFFERENTIAL APPARATUS WITH SPEED AND TORQUE SENSITIVE DIFFERENTIAL LIMITING FORCES

[75] Inventors: Masao Teraoka; Satoshi Aiba; Kenji Hiraishi; Shuhei Ono, all of Tochigi, Japan

[73] Assignee: Tochigifujisangyo Kabushiki Kaisha, Tochigi, Japan

[21] Appl. No.: 93,051

[22] Filed: Jul. 16, 1993

[30] Foreign Application Priority Data

Jul. 17, 1992 [JP] Japan ................................ 4-190799
Sep. 2, 1992 [JP] Japan ................................ 4-234631

[51] Int. Cl.[6] .......................... F16H 48/10; F16H 48/26
[52] U.S. Cl. ............................................ 475/249; 475/89
[58] Field of Search ............................... 475/84, 85, 249, 475/86, 87, 88, 89, 90; 192/57

[56] References Cited

U.S. PATENT DOCUMENTS

| | | | |
|---|---|---|---|
| 4,957,473 | 9/1990 | Takemura et al. | 475/249 |
| 4,983,150 | 1/1991 | Tashiro et al. | 475/89 |
| 5,122,102 | 6/1992 | Chludek et al. | 475/249 |

Primary Examiner—Richard M. Lorence
Assistant Examiner—Sherry Lynn Estremsky

[57] ABSTRACT

A differential apparatus comprises: a differential casing; a first side gear rotatably arranged within the differential casing and connected to the first shaft; a second side gear rotatably arranged within the differential casing in parallel to the first side gear and connected to the second shaft; at least one short pinion gear housed in a bore formed in the differential casing so as to be rotated within the bore and around the first and second side gears together with the differential casing; at least one long pinion gear housed in another bore formed in the differential casing in parallel to and in mesh with the short pinion gear so as to be rotated within the bore and around the first and second side gears together with the differential casing; and a viscous coupling. The first and second side gears are geared to each other through the short and long pinion gears so as to be rotated differentially relative to each other, when the short and long pinion gears are driven by the differential casing. The differential apparatus can generate a torque sensitive differential limiting force uniform both when a torque is transmitted to the first shaft under the condition that the second shaft is being idled and when a torque is transmitted to the second shaft under the condition that the first shaft is being idled; and a speed sensitive differential limiting force generated by the viscous coupling.

5 Claims, 16 Drawing Sheets

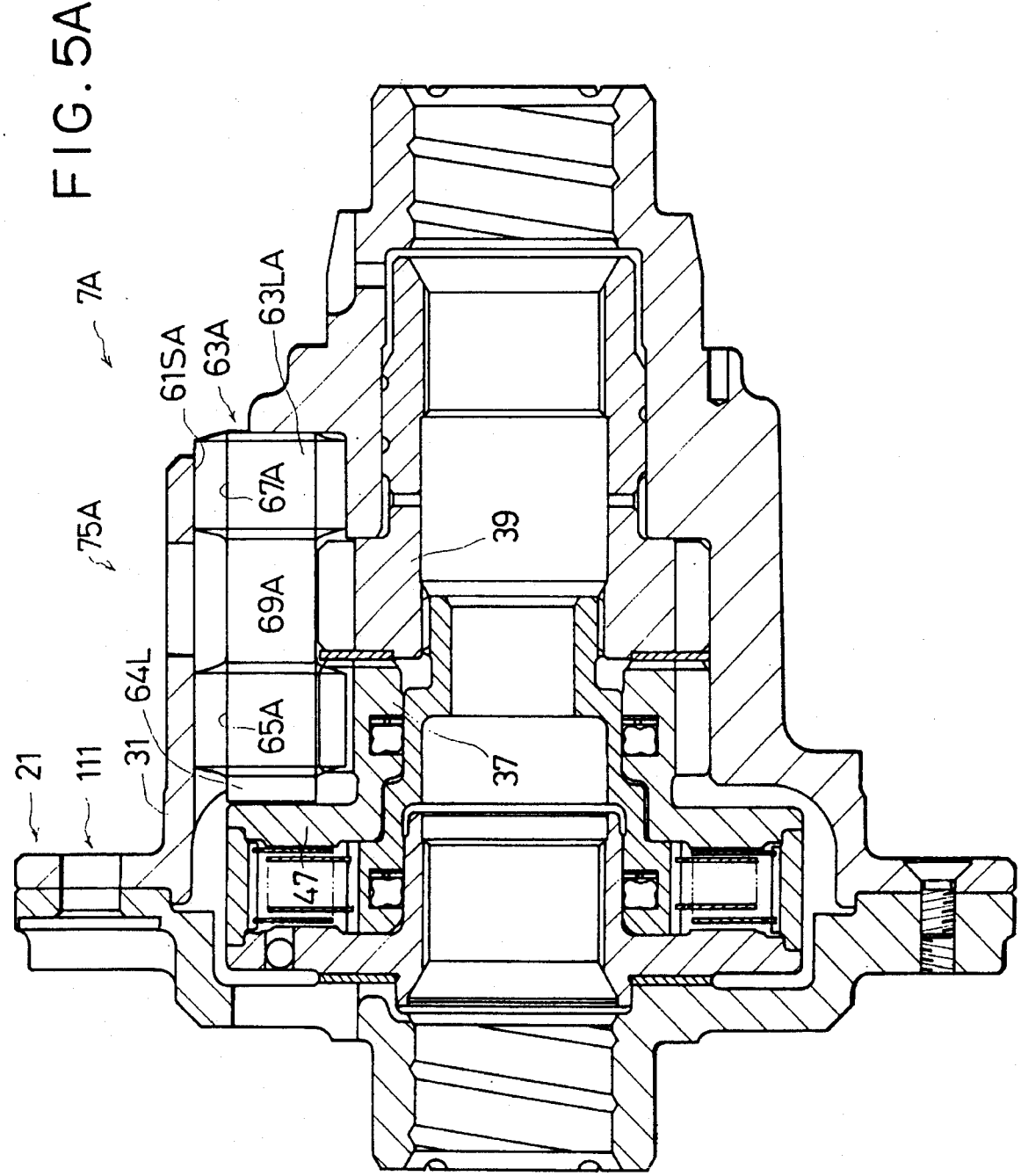

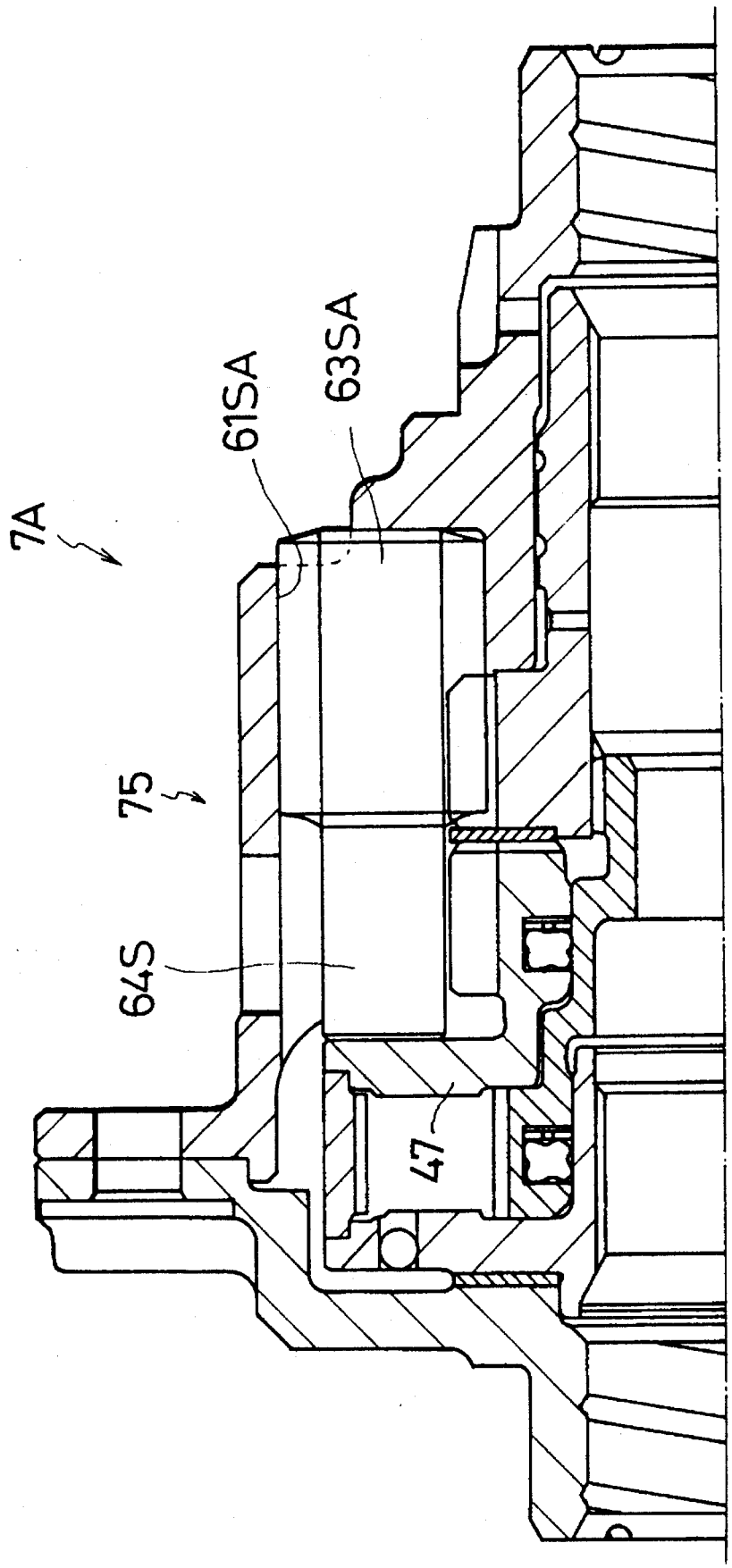

DIFFERENTIAL APPARATUS WITH SPEED AND TORQUE SENSITIVE DIFFERENTIAL LIMITING FORCES

TECHNICAL FIELD

The present invention relates to a differential apparatus suitable for use with an automotive vehicle, and more specifically to a differential apparatus provided with both speed sensitive and torque sensitive differential limiting forces.

BACKGROUND ART

Examples of prior art differential gears are disclosed in Japanese Published Unexamined (Kokai) Utility Model Laid Open Nos. 68-78746 and 62-172842, as shown in FIGS. 1A and 1B, respectively.

In FIG. 1A, the prior art differential gear 201 comprises a bevel gear type differential gear mechanism 207, a viscous coupling 211 for limiting differential motion, and a multiple disk clutch 215. The viscous coupling 211 is differential limiting means for generating a differential limiting force which increases with increasing number of differential rotations. Further, the multiple disk clutch 215 is engaged on the basis of a reaction force generated due to mesh between a side gear 219 and a pinion gear 223. Since this mesh reaction force between two gears 219 and 228 increases with increasing transmission torque of the differential gear mechanism 207, the multiple disk clutch 215 is a kind of differential limiting means of torque sensitive type.

In the above-mentioned differential gear 201, on the other hand, the left side gear 219 is connected to a left wheel shaft 288 via a hub 231, and a right side gear 235 is directly connected to a right side wheel shaft 237, respectively. Further, the multiple disk clutch 215 is interposed between the hub 231 and the differential casing (or housing) 239, so that the multiple disk clutch 215 is of S (shaft)-H (housing) type.

In the same way, in FIG. 1B, the prior art differential gear 203 comprises a bevel gear type differential gear mechanism 209, a viscous coupling 213 for limiting differential motion, and a multiple disk clutch 217. The viscous coupling 213 is differential limiting means for generating a differential limiting force which increases with increasing number of differential rotations. Further, the multiple disk clutch 217 is engaged on the basis of a reaction force generated due to mesh between a side gear 221 and a pinion gear 225. Since this mesh reaction force between two gears 221 and 225 increases with increasing transmission torque of the differential gear mechanism 209, the multiple disk clutch 217 is a kind of differential limiting means of torque sensitive type.

In the above-mentioned differential gear 203, on the other hand, the multiple disk clutch 217 is interposed between the right side gear 221 and a differential casing (housing) 241, and the viscous coupling 213 is also interposed between the side gear 243 and the differential casing (housing) 241, respectively. Therefore, the multiple disk clutch 217 is also of S (shaft)-H (housing) type.

Here, in the differential gear 201, the transfer ratio $R_{tL}$ of the left side wheel shaft 233 and the transfer ratio $R_{tR}$ of the right side wheel shaft 237 can be expressed as follows:

$$R_{tL} = \frac{1+f_L}{1-f_R}$$

$$R_{tR} = \frac{1+f_R}{1-f_L}$$

where $F_L$ denoted a frictional torque generated by the multiple disk clutch 215 according to a magnitude of an input torque and then transmitted to the left side wheel shaft 233; $F_R$ denoted a frictional torque generated by the multiple disk clutch 215 according to a magnitude of an input torque and then transmitted to the right side wheel shaft 237, respectively.

Here, if $f_L=0$, $$R_{tL} = \frac{1}{1-f_R}$$

$$R_{tR} = \frac{1+f_R}{1}$$

Here, since $f_R \neq 0$, $R_{tL} \neq R_{tR}$, thus causing an unbalanced or non-uniform transfer ratio.

In the case of the differential gear 201 as shown in FIG. 1A, engine power is transmitted from the differential casing 239 to the left and right side wheel shafts 233 and 237 as shown by thick solid lines 249, and further a driving power as shown by dashed lines in FIG. 1A is also transmitted to the right side wheel shaft 237.

In summary, when the differential limiting means is interposed in way of the above-mentioned S-H arrangement type, there exists a problem in that the differential limiting force is not uniform On the right and left side wheel shafts.

The above-mentioned non-uniform power transmission will be described in more detail with reference to FIG. 1C-1, which is a graphical representation showing the differential limiting characteristics of the differential gear 201. In FIG. 1C-1, the ordinate represents a torque transmitted to the right wheel shaft under condition that the left wheel shaft is skidding or idling, and the abscissa represents a torque transmitted to the left wheel shaft under condition that the right wheel shaft is skidding or idling. In the graph shown in FIG. 1C-1, the straight line 253(R) indicates the right wheel shaft torque obtained through the multiple disk clutch 215, and the straight line 255(L) indicates the left wheel shaft torque obtained through the multiple disk clutch 215, respectively. These straight lines 253(R) and 255(L) indicate that the left and right wheel shaft torques are not symmetrical with respect to the straight line 257 with a gradient of 45 degrees; that is, the right wheel shaft torque 253(R) is larger than the left wheel shaft torque 255(L). In FIG. 1C-1, the ratio of the gradient $\theta_R$ of the straight line 253(R) from the abscissa to the gradient $\theta_L$ Of the straight line 255(L) from the ordinate is referred to as transfer ratio (Rt).

Further, in FIG. 1C-1, when a uniform differential limiting force is applied to both the above-mentioned wheel shaft torques indicated by the lines 253(R) and 255(L) through the viscous coupling 211, the straight line 253(R) indicative of the right wheel shaft torque is shifted to the straight line 259(R), and the straight line 255(L) indicative of the left wheel shaft torque is shifted to the straight line 261(L), respectively into asymmetrical relationship with respect to each other.

FIG. 1C-2 is a graphical representation showing the differential limiting characteristics of the differential gear 203 shown in FIG. 1B. In FIG. 1C-2, the ordinate represents a torque transmitted to the right wheel shaft under condition that the left wheel shaft is skidding or idling, and the abscissa represents a torque transmitted to the left wheel shaft under condition that the right wheel shaft is skidding or idling. In the graph shown in FIG. 1C-2, the straight line 263(L) indicates the left wheel shaft torque obtained through the multiple disk clutch 217, and the straight line 265(R) indicates the right wheel shaft torque obtained through the multiple disk clutch 217, respectively, which is opposite to those shown in FIG. 1C-1. This is because the multiple disk clutch 217 is interposed on the side of the right side gear 22 in way of the S-H arrangement type. These straight lines 263(L) and 265(R) indicate that the left and right wheel shaft torques are not symmetrical with respect the straight line 257 with a gradient of 45 degrees; that is, the left wheel shaft torque is larger than the right wheel shaft torque. In FIG. 1C-2, the ratio of the gradient $θ_L$ of the straight line 263(L) from the abscissa to the gradient $θ_R$ of the straight line 265(R) from the ordinate is referred to as transfer ratio ($R_t$).

Further, in FIG. 1C-2, a uniform differential limiting force is applied to both the above-mentioned wheel shaft torques indicated by the lines 263(L) and 265(R) through the viscous coupling 213, the straight line 263(L) indicative of the left wheel shaft torque is shifted to the straight line 267(L), and the straight line 265(R) indicative of the right wheel shaft torque is shifted to the straight line 269(R), respectively into asymmetrical relationship with respect to each other.

In summary, in the conventional differential gear provided with both torque sensitive and speed sensitive characteristics, it has been impossible to obtain the differential limiting characteristics uniform on both right and left sides of the wheel shafts.

SUMMARY OF THE INVENTION

With these problems in mind, therefore, it is the primary object of the present invention to provide a differential apparatus provided with means for generating torque sensitive and speed sensitive differential limiting forces, both uniform when one of the wheel shafts is being idled and when the other of the wheel shafts is being idled, the differential apparatus which further can make identical both length of driving force transmitting shafts.

To achieve the above-mentioned object, a differential apparatus according to the present invention comprises: a differential gear mechanism (75, 161) interposed between a first shaft (9) and a second shaft (11), for generating torque sensitive differential limiting force uniform both when a torque is transmitted to the first shaft under the condition that the second shaft is being idled and when a torque is transmitted to the second shaft under the condition that the first shaft is being idled; and coupling means (111,339) also interposed between the first shaft and the second shaft, for generating speed sensitive differential force liming force, in addition to the torque sensitive differential limiting force generated by said differential gear mechanism.

The differential gear mechanism comprises: a differential casing (21); a first side gear (37, 139) rotatably arranged within said differential casing and connected to the first shaft; a second side gear (39, 141) rotatably arranged within said differential casing in parallel to said first side gear and connected to the second shaft; at least one short pinion gear (63S, 153S) housed in a bore formed in said differential casing so as to be rotated within the bore and around said first and second side gears together with said differential casing; at least one long pinion gear (63L, 153L) housed in another bore formed in said differential casing in parallel to and in mesh with said short pinion gear so as to be rotated within the bore and around said first and second side gears together with said differential casing; and said first and second side gears being geared to each other through said short and long pinion gears so as to be rotated differentially relative to each other, when said short and long pinion gears are driven by said differential casing.

The uniform torque sensitive differential limiting force can be generated by rotational sliding friction resistance generated in contact surfaces between said short and long pinion gears and the differential casing in the bores, respectively. Further, when said short and long pinion gears and said first and second side gears are all helical gears, the uniform torque sensitive differential limiting force can be generated by pressure-contact friction resistance generated by thrust forces of said first and second side gears in a contact surface between both. Further, when short and long pinion gears and said first and second side gears are all helical gears, the uniform torque sensitive differential limiting force can be generated by pressure-contact friction resistance generated by thrust forces of said first and second side gears in both contact surfaces between said first, second side gears and said differential casing. The uniform torque sensitive differential limiting force is used for vehicle frontward or rearward travel.

The coupling means is a viscous coupling (111), which comprises a working chamber (97) formed between a cylindrical member (45) connected to the first shaft and a hub (91) connected to the second shaft; a plurality of resistance plates engaged with the cylindrical member in Juxtapositional relationship with respect to each other; a plurality of resistance plates engaged with the hub in juxtapositional relationship with respect to each other alternately between the resistance plates engaged with the cylindrical member; and a working fluid filling the working chamber.

Further, the coupling means is an orifice coupling (339), which comprises: a cam casing (341) connected to the first shaft and formed with a plurality of inner cam surfaces (359); a rotor (343) connected to the second shaft and formed with a plurality of cylinders (347) extending radially outward; a plurality of pistons (345) each radially movably disposed within each of the cylinders of said rotor so that a radially outward end surface thereof is brought into contact with each of the cam surfaces of said cam casing; a working fluid filling the cylinders of said rotor; and differential limiting force adjusting means (349) including an orifice plate (373) and a plate valve (371), for adjusting an inner pressure of the working fluid in such a way as to obtain a relatively large differential limiting force at low inner pressure and to suppress an increase of the large differential limiting force at high inner pressure.

In the first aspect of the present invention, the differential apparatus comprises: a differential casing (21); a first side gear (37, 139) rotatably arranged within said differential casing and connected to the first shaft; a second side gear (39,141) rotatably arranged within said differential casing in parallel to said first side gear and connected to the second shaft; at least one short pinion gear (63S, 153S) housed in a bore formed in said differential casing so as to be rotated within the bore and around said first and second side gears together with said differential casing; at least one long pinion gear (63L, 153L) housed in another bore formed in said differential casing in parallel to and in mesh with said short pinion gear so as to be rotated within the bore and around said first and second side gears together with said differential casing; said first and second side gears being geared to each other through said short and long pinion gears so as to be rotated differentially relative to each other, when said short and long pinion gears are driven by said differential casing; a working chamber (97) formed between a cylindrical member (45) connected to the first shaft and a hub (91) connected to the second shaft; a plurality of resistance plates engaged with the cylindrical member in juxtapositional relationship with respect to each other; a plurality of resistance plates engaged with the hub in juxtapositional relationship with respect to each other alternately between the resistance plates engaged with the cylindrical member; and a working fluid filling the working chamber.

Further, in the second aspect of the present invention, the differential apparatus comprises: a differential casing (21); a first side gear (37, 139) rotatably arranged within said differential casing and connected to the first shaft; a second side gear (39, 141) rotatably arranged within said differential casing in parallel to said first side gear and connected to the second shaft; at least one short pinion gear (63S, 153S) housed in a bore formed in said differential casing so as to be rotated within the bore and around said first and second side gears together with said differential casing; at least one long pinion gear (63L, 153L) housed in another bore formed in said differential casing in parallel to and in mesh with said short pinion gear so as to be rotated within the bore and around said first and second side gears together with said differential casing; said first and second side gears being geared to each other through said short and long pinion gears so as to be rotated differentially relative to each other, when said short and long pinion gears are driven by said differential casing; a cam casing (341) connected to the first shaft and formed with a plurality of inner cam surfaces (359); a rotor (343) connected to the second shaft and formed with a plurality of cylinders (347) extending radially outward; a plurality of pistons (345) each radially movably disposed within each of the cylinders of said rotor so that a radially outward end surface thereof is brought into contact with each of the cam surfaces of said cam casing; a working fluid filling the cylinders of said rotor; and differential limiting force adjusting means (349) including an orifice plate (373) and a plate valve (371), for adjusting an inner pressure of the working fluid in such a way as to obtain a relatively large differential limiting force at low inner pressure and to suppress an increase of the large differential limiting force at high inner pressure.

In the differential apparatus according to the present invention, a torque sensitive type differential gear mechanism is arranged on one side of the differential casing, and the speed sensitive type coupling is arranged on the other side of the differential casing. The differential gear mechanism comprises two side gears and short and long pinion gears. Therefore, when the differential casing is rotated, the rotative power is distributed to the first and second shafts connected to the two side gears, respectively, through the short and long pinion gears. In this case, rotative sliding frictional resistance is generated in the contact surfaces between the short and long pinion gears and the differential casing according to the shaft torques. Further, the sliding frictional resistance is generated in the contact surfaces between the two side gears or between the end surfaces of the two side gears and the differential casing according to the shaft torques. Since the frictional resistance changes according to the contact pressure at each of the contact surfaces; that is, the torques of the two side gears connected to the two wheel shafts, respectively, it is possible to generate torque sensitive differential limiting force between the two wheel shafts in the uniform conditions on both sides when any one of the wheel shafts is being idled. Further, when the helical gears are used, it is possible to change the magnitude of the differential limiting force according to the vehicle travel direction (forward or rearward). In addition, since the viscous or orifice coupling is interposed between the two wheel shafts in shaft-shaft arrangement manner via the hubs, it is also possible to generate speed sensitive differential limiting force in the same uniform conditions as with the case of the torque sensitive differential limiting force.

Further, in the differential apparatus according to the present invention, since the hubs are arranged appropriately, it is possible to equalize the axial lengths of the right and left wheel shafts.

BRIEF DESCRIPTION OF THE DRAWINGS

FIG. 1C-2 is graphical representation showing differential limiting characteristics of the second prior art differential gear;

FIG. 2 is a skeleton diagram showing a power system of an automotive vehicle to which the differential apparatus according to the present invention is applied;

FIG. 5A is a cross-sectional view showing a modification of the first embodiment of the differential apparatus according to the present invention, in which a long pinion gear is shown;

FIG. 5B is a cross-sectional view showing the modification of the first embodiment of the differential apparatus according to the present invention, in which a short pinion, gear is shown:

DETAILED DESCRIPTION OF THE PREFERRED EMBODIMENTS

Embodiments of the differential apparatus according to the present invention will be described hereinbelow with reference to the attached drawings.

Figure 1A:
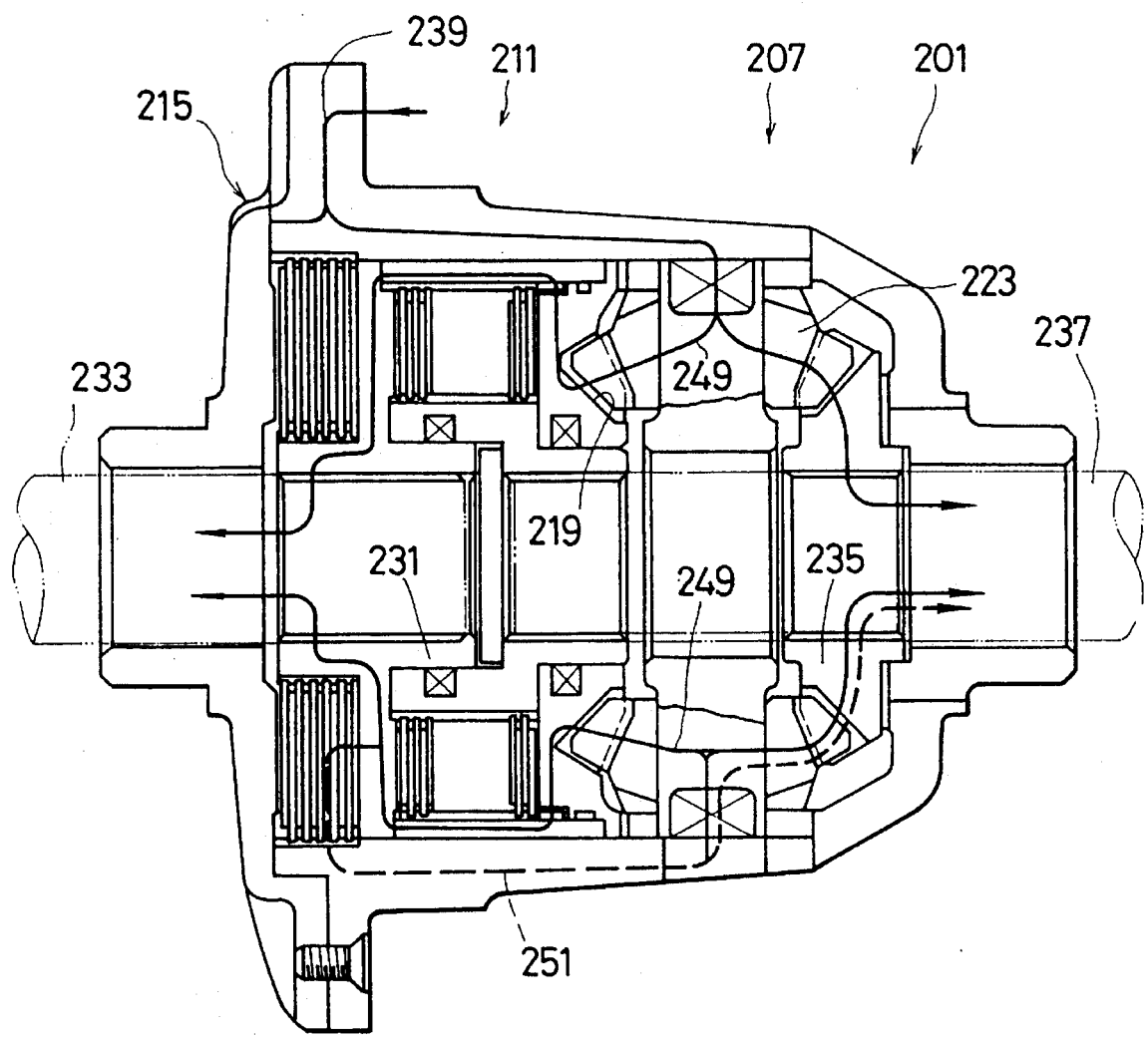
FIG. 1A is a cross-sectional view showing a first example of prior art differential gears.
Figure 1B:
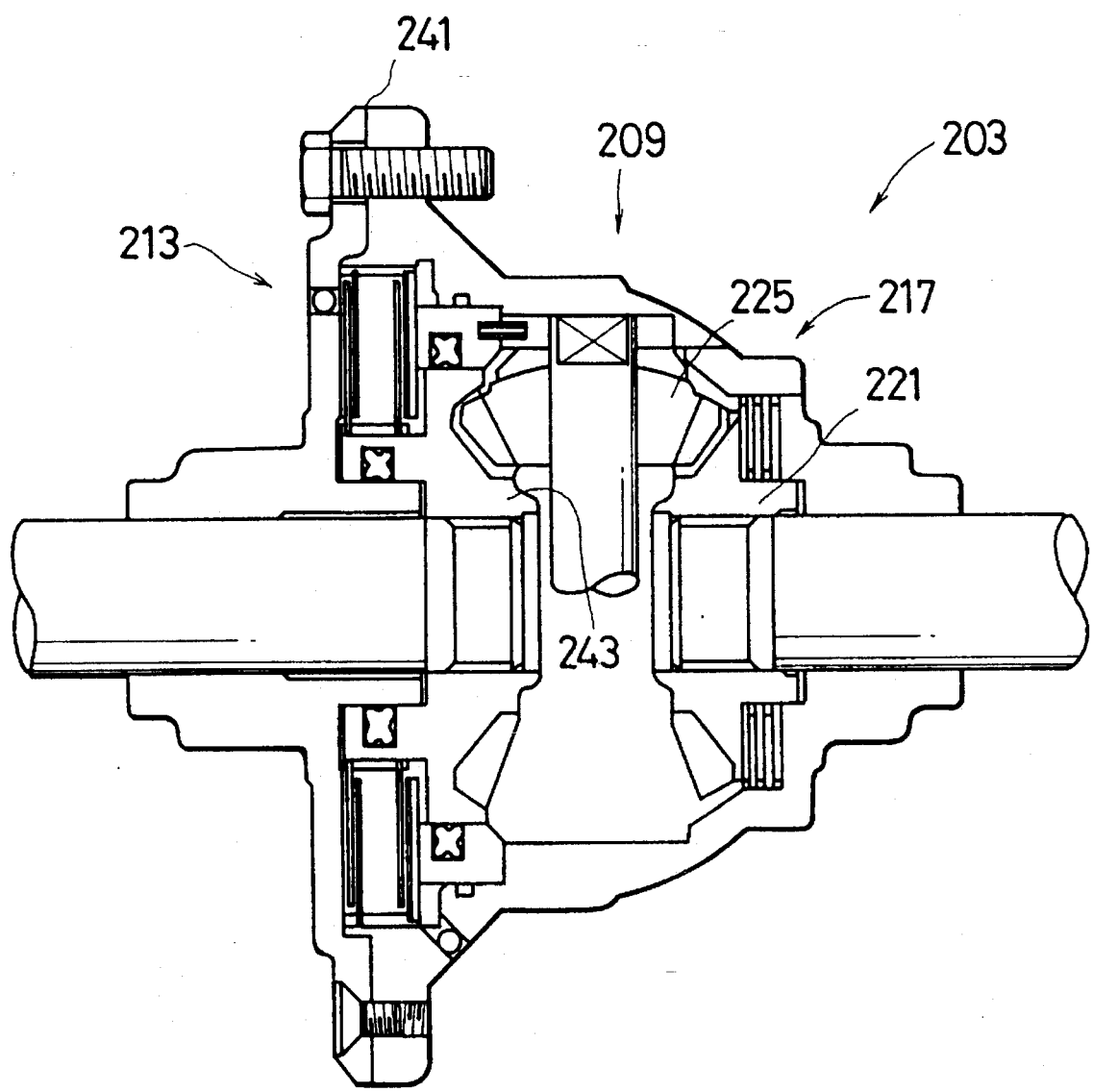
FIG. 1B is a cross-sectional view showing a second example of prior art differential gears.
Figures 1, 1C:
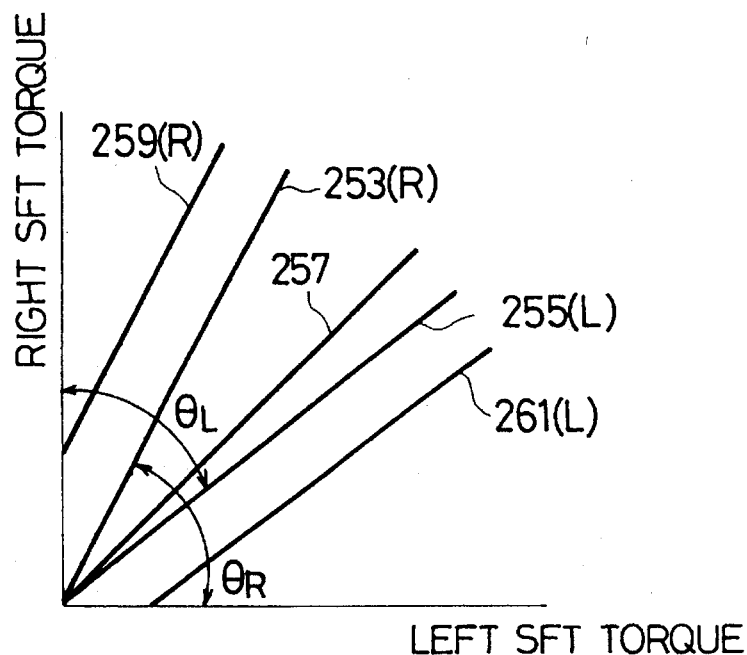
FIG. 1C-1 is a graphical representation showing differential limiting characteristics of the first prior art differential gear.
Figures 1, 1C, 2:
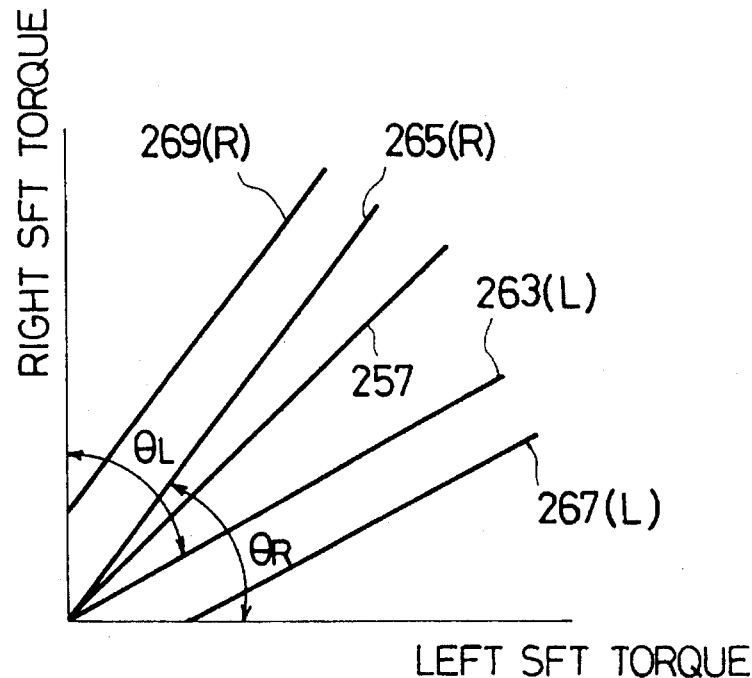
Figure 2:
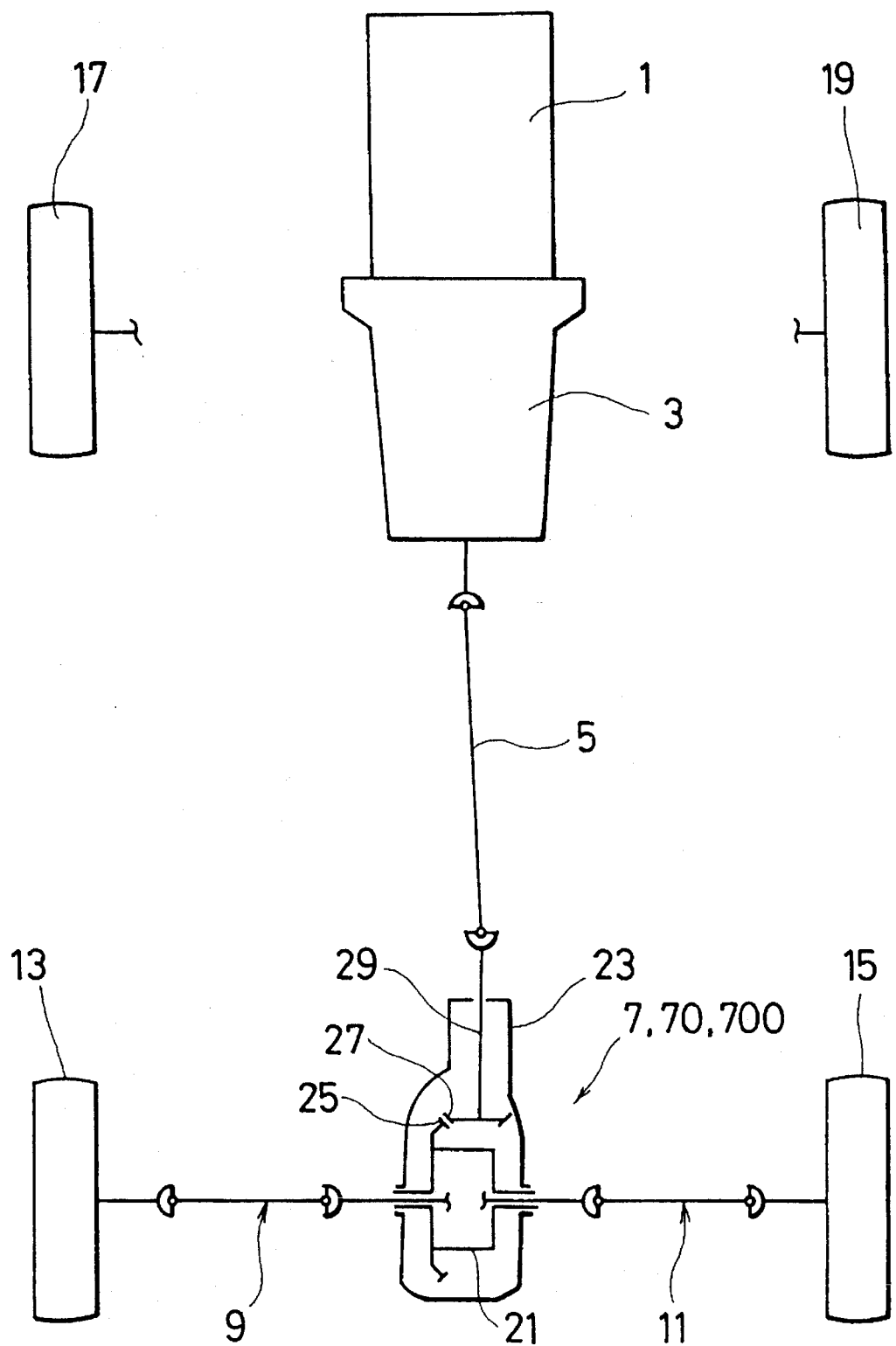

FIG. 2 shows a power system for an automotive vehicle to which the differential apparatus according to the present invention is applied. In the drawing, the power system comprises an engine 1, a transmission 3, a propeller shaft 5, a rear differential gear (which corresponds the differential apparatus 7, 70 or 700 according to the present invention), rear left and right wheel shafts 9 and 11, rear left and right wheels 13 and 15, front left and right wheel 17 and 19, etc. A differential casing 21 of the rear differential gear is rotatably disposed within a differential carrier 23. A ring gear 25 fixed to the differential casing 21 is in mesh with a drive pinion gear 27. The drive pinion gear 27 is formed with a drive pinion shaft 29 connected to the propeller shaft 5. Therefore, when the engine 1 is driven, engine power Is transmitted to the rear differential apparatus 7, 70 or 700 via the transmission 3 and the propeller shaft 5 to rotate the differential casing 21 via the drive pinion gear 27 and the ring gear 25. Further, the right and left directions shown in FIG. 2 correspond to the right and left directions shown in the FIGS. 3A, 3B, 5A, 5B, 6A, 6B and 7.

The first embodiment of the differential apparatus 7 according to the present invention will be described in detail with reference to FIGS. 3A to 3D. The differential apparatus 7 is roughly composed of a differential casing 21, a differential gear mechanism 75 including a link gear mechanism 63, and a viscous coupling 111. The differential casing 21 is composed of a casing body 31 and a cover 35 fixed to this casing body with screws 33. The differential gear mechanism 75 is composed of a pair of left and right side gears 37 and 39 (a differential gear mechanism) and a plurality of pairs of a long pinion gear 63L and a short pinion gear 63S (a link gear mechanism). The viscous coupling 111 is disposed between the two left and right side gears 37 and 39.

In more detail, within the differential casing 21, a pair of the left and right side gears 37 and 39 (a differential gear mechanism) are rotatably housed. A left hub 41 is disposed on the left side of the left side gear 37. A flange potion 43 of the left hub 41 is connected to the left side gear 37 by welding, for instance via a cylindrical member 45 and a flange portion 47 of the left side gear 37. The left hub 41 is rotatably supported by a bearing portion 49 of the cover 35. A washer 51 is interposed between the flange portion 43 of the left hub 41 and the cover 35. The left hub 41 is spline-coupled with the rear left wheel shaft 9 and further retained with a retainer ring 57 for prevention of removal of the rear left wheel shaft 9 form the hub 41.

On the other hand, the right side gear 39 is formed with a right hub 53. The right hub 53 is rotatably supported by a bearing portion 55 of the casing body 31. The right hub 53 is spline-coupled with the rear right wheel shaft 11 and further retained with another retainer 59 for prevention of removal the rear right wheel shaft 11 from the hub 53.

Figure 3A:
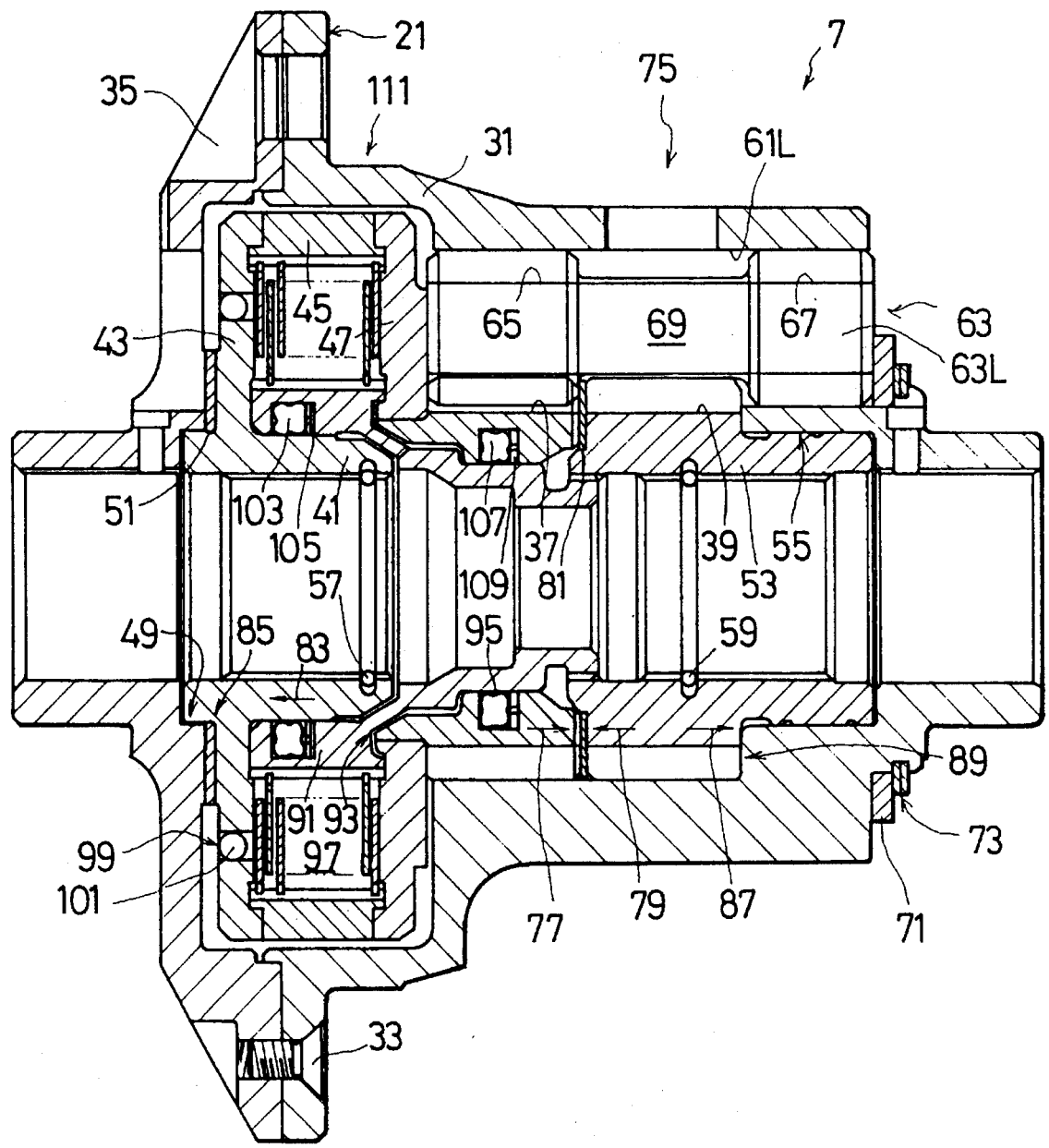
FIG. 3A is a cross-sectional view showing a first embodiment of the differential apparatus according to the present invention, in which a long pinion gear is shown.
Figure 3B:
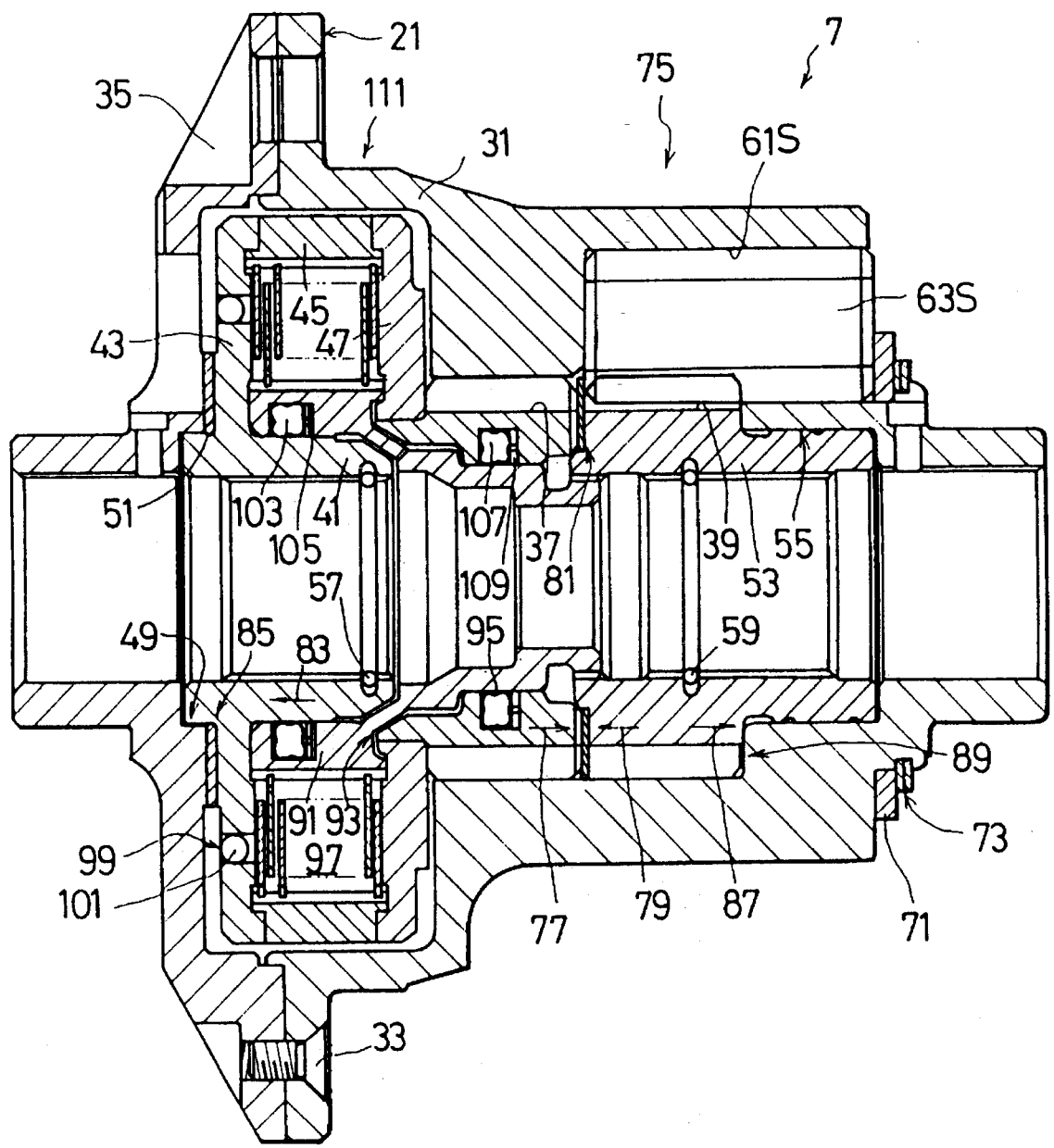
FIG. 3B is a cross-sectional view showing the first embodiment of the differential apparatus according to the present invention, in which a short pinion gear is shown.
Figure 3C:
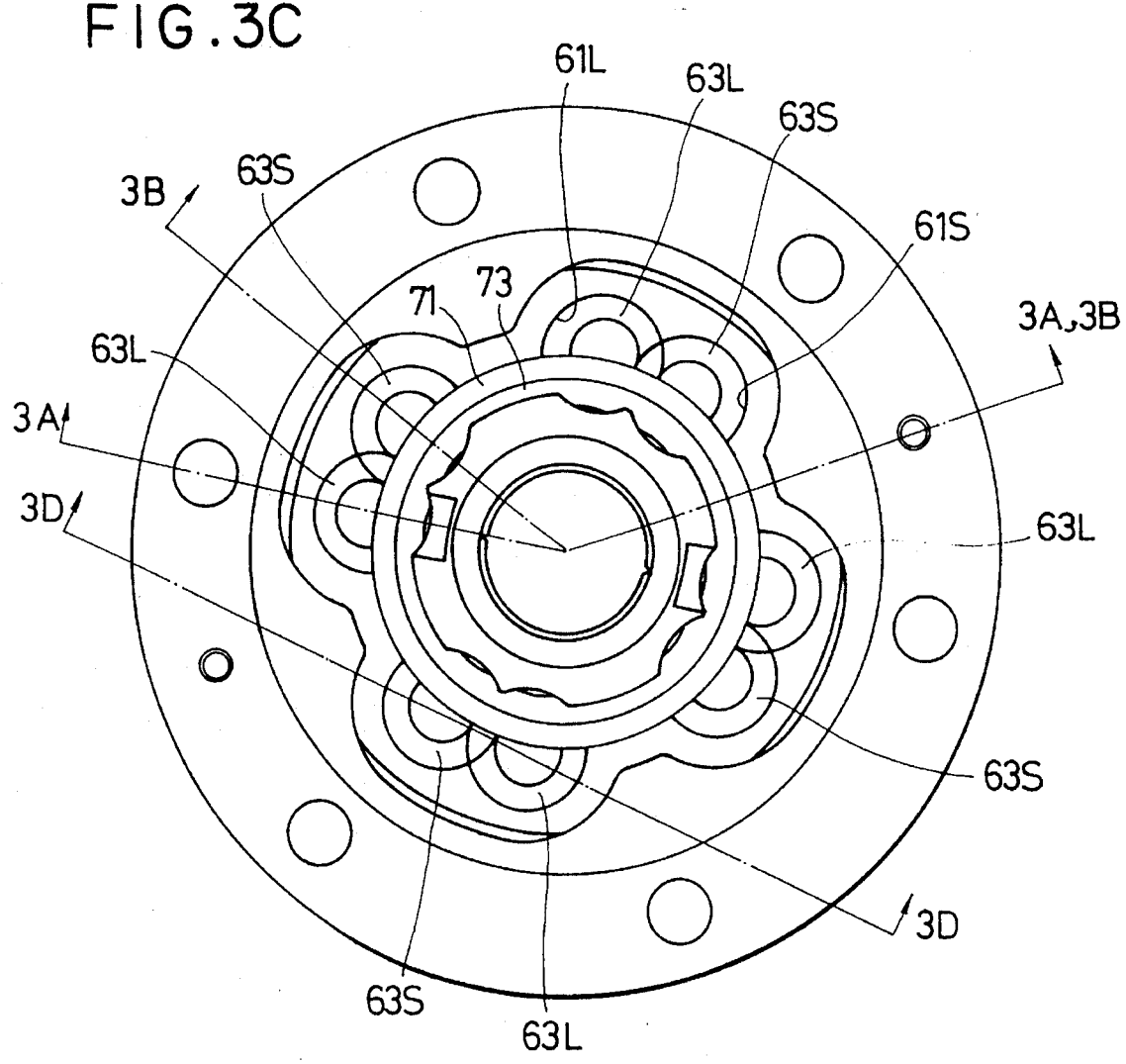
FIG. 3C is a side view showing a differential casing of the first embodiment thereof.

As shown in FIG. 3C, a plurality (e.g., four) of pairs of long pinion housing bores 61L and short pinion housing bores 61S are formed axially extending from the right side end surface of the casing body 31 so as to be arranged in the circumferential direction of the differential casing 21 in partially overlapped positional relationship with respect to each other. Each of the long pinion gears 63L is rotatably or slidably housed in each of the long pinion housing bores 61L, and each of the short pinion gears 63S is rotatably or slidably housed in each of the short pinion housing bores 61S, respectively. Each of these pinion gears 63L and 63S can be rotated around of its own axis within each housing bore 61L or 61S and further around the axis of the two side gears 37 and 39 together with the differential casing 21, respectively so as to enable differential rotation between the two side gears 37 and 39.

Figure 3D:
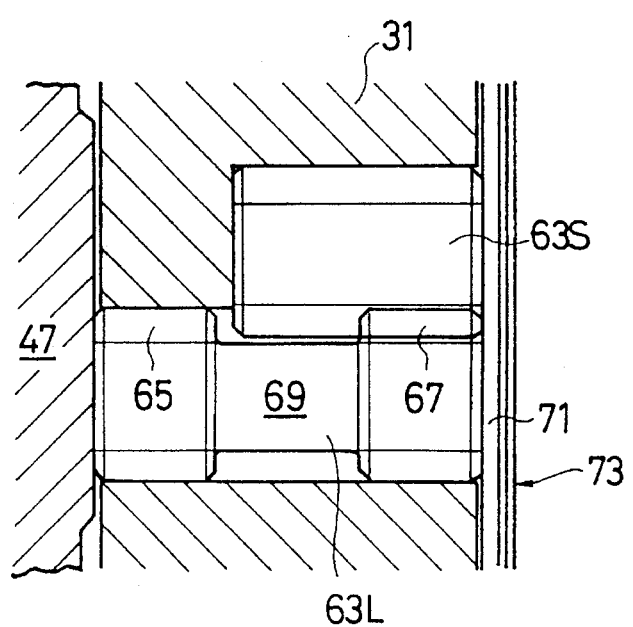
FIG. 3D is an development view showing two long and short pinion gears in mesh with each other.

The long pinion gear 63L is formed with a left gear portion 65, a right gear portion 67, and an intermediate shaft portion 69. The intermediate shaft portion 69 is small in diameter so as not to interfere with the right side gear 39, as shown in FIG. 3A. As depicted in FIG. 3A, the left side gear portion 65 of the long pinion gear 63L is in mesh with the left side gear 37. As shown in FIG. 3B, the short pinion gear 63L is in mesh with the right side gear 39. Further, as depicted in FIG. 3D, the right side gear portion 67 of the long pinion gear 63L is in mesh with the short pinion gear 63S. Accordingly, the two side gears 37 and 39 are linked with each other through the two long and short pinion gears 63L and 63S, differentially. The left end surface of each of the long pinion gears 63L is in contact with the flange portion 47 of the left side gear 37, and the left end surface of each of the short pinion gears 63S is in contact with an inner wall surface of the casing body 31, as shown in FIG. 3D. Further, both the right end surfaces of the long and short pinion gears 63L and 63S are supported by a washer 71 retained by a retainer 73 on the right side of the differential casing 21, as shown in FIGS. 3A and 3B, respectively.

Accordingly, when the engine 1 is driven, engine power is transmitted to the differential casing 21 via the transmission 3 and the propeller shaft 5 to rotate the differential casing 21. The rotative power of the differential casing 21 is distributed to the left and right side gears 37 and 39, respectively. In more detail, the power of the differential casing 21 is transmitted to the left side gear 37 via the long pinion gears 63L and/or the short pinion gears 63S and to the right side gear 39 via the long pinion gears 63L and/or the short pinion gears 63S. Once a difference in driving resistance is produced between two rear wheels 13 and 15, the engine power is differentially distributed to the left and right wheel shafts 9 and 11 via the differential gear mechanism 75 composed of a pair of left and right side gears 37 and 39 and the link gear mechanism 63 composed of a plurality of pairs of a long pinion gear 63L and a short pinion gear 63S.

The respective gears of the above-mentioned differential gear mechanism 75 and the link mechanism 63 are all of helical gear. The direction of these helical gears is as follows: when the differential casing 21 is rotated in the direction that the vehicle travels frontward, two thrust forces 77 and 79 of the two side gears 37 and 39 are generated in the directions that both side gears 37 and 39 are brought into contact with each other and slid relative to each other at a sliding portion (washer) 81. On the other hand, when the differential casing 21 is rotated in the direction that the vehicle travels rearward, two thrust forces 83 and 87 of the two side gears 37 and 39 are generated in the directions that both side gears 37 and 39 are brought away from each other at a sliding portion 81; that is, the flange portion 43 of the left hub 41 is brought into contact with the washer 51 and slid relative to each other at a sliding portion 85 and further the right end surface of the right side gear 39 is brought into contact with the casing body 31 and slid relative to each other at a sliding portion 89, respectively. In this embodiment, the frictional coefficient of the middle sliding portion 81 is determined larger than that at the two side sliding portions 85 and 89. Therefore, the differential limiting force during the frontward travel is larger than that during the rearward travel.

In addition, the two thrust forces 83 and 87 are generated, the left end surfaces of the long pinion gears 63L are brought into contact with the flange portion 47 of the left hub 41 and slid relative to each other, and the right end surfaces thereof are brought into contact with the thrust washer 71 and slid relative to each other. Further, the left end surfaces of the short pinion gears 63S are brought into contact with the inner wall surface (see FIG. 3D) of the casing body 31 and slid relative to each other, and the right end surfaces thereof are brought into contact with the thrust washer 71 and slid relative to each other. The frictional coefficients at these sliding portions are determined to be equal to each other. In addition, the rotative frictional forces can be obtained between the long and short pinion gears 63L and 63S and the casing body 31 within the respective pinion housing bores 61L and 61S, respectively.

Accordingly, the differential motion of the differential gear mechanism 75 (the two helical side gears 37 and 39) and the link mechanism 63 (the respective helical pinion gears 63L and 63S) can be limited by the sliding frictional forces generated at the respective sliding portions 81 or 85, 89, etc. and the rotative frictional forces generated between the respective pinion gears and the casing body 31. The above-mentioned frictional resistance is proportional to the transmission torque of the differential gear mechanism 75, so that it is possible to regard that the respective sliding portions constitute differential limiting means of torque sensitive type or that the differential mechanism 75 and the link mechanism 63 are provided with the differential limiting function of torque sensitive type, respectively.

The viscous coupling 111 is constructed as follows: an intermediate hub 91 is disposed between the flange portion 43 of the left hub 41 and the flange portion 47 of the left side gear 37. This intermediate hub 91 is rotatably supported by the outer circumferential surface of the left hub 41. This intermediate hub 91 is formed with a linking portion 95 extending through a gap 93 between the left hub 41 and the left side gear 37 toward the right side. This linking portion 95 is spline-coupled to the right hub 53. A working chamber 97 is formed between the flange portion 43 of the left hub 41 and the flange portion 47 of the left side gear 37 and between the cylindrical portion 45 and the intermediate hub 91. A high viscous silicone oil is put into this working chamber 97 through an inlet hole 99. The inlet hole 99 is closed by pressure fitting a ball 101 thereinto. A plurality of outer plates are engaged with the inner circumferential surface of the cylindrical member 45, and a plurality of inner plates are engaged with the outer circumferential surface of the intermediate hub 91 in alternate juxtapositional relationship with respect to each other. An X-ring 103 (X-shaped cross-section sealing member) and a backup ring 105 are interposed between the intermediate hub 91 and the left hub 41 for prevention of oil leakage. Further, an X-ring 107 and a backup ring 109 are interposed between the linking portion 95 of the intermediate hub 91 and the left side gear 37 for prevention of oil leakage.

The outer plates are coupled to the rear left wheel shaft 9 via the left hub 41, and the inner plates are coupled to the rear right wheel shaft 11 via the intermediate hub 91 and the right hub 53. Accordingly, the viscous coupling 111 is disposed between the two shafts 9 and 11, thus constructing a speed sensitive differential limiting mechanism of S(shaft)-S(shaft) arrangement type for the differential gear mechanism 75.

In this viscous coupling 111, since the intermediate hub 91 is connected to the right hub 53 via the linking portion 95, it is possible to equalize the axial lengths of both the rear left and right wheel shafts 9 and 11, being different from the prior art differential gear as shown in FIG. 1A. In the prior art apparatus, the axial length of the right wheel shaft 237 is longer than that of the left wheel shaft 233 for connection with the viscous coupling 211.

The differential limiting characteristics of the differential apparatus 7 as described above will be explained with reference to FIGS. 4A and 4B.

Figure 4A:
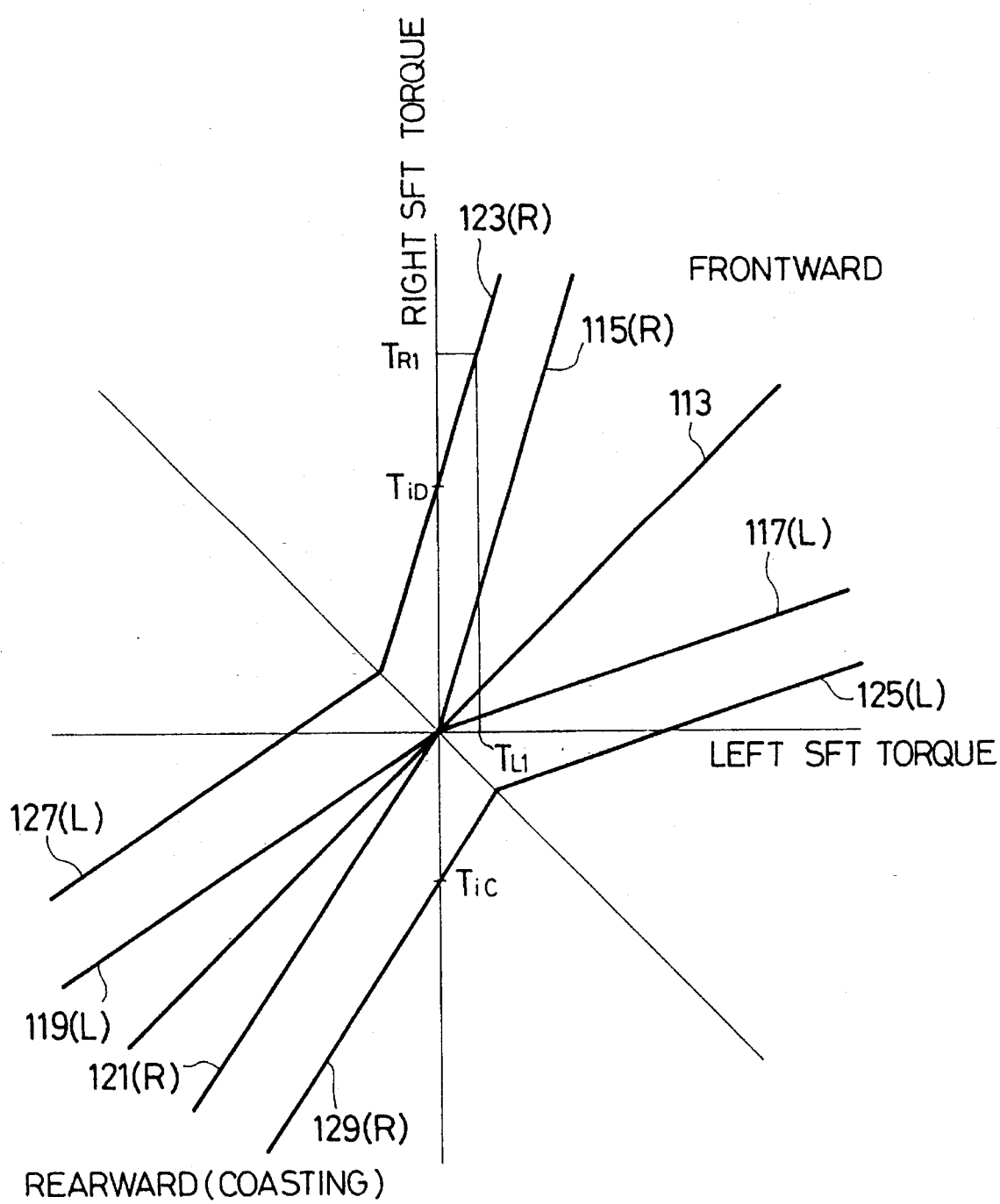
FIG. 4A is a graphical representation showing the differential limiting characteristics of the first embodiment of the differential apparatus shown in FIG. 3.

FIG. 4A shows the transfer ratio (Rt) of the differential apparatus 7, in which the first quadrant is the frontward travel range; and the third quadrant is the rearward coasting (driven by only vehicle inertia after the clutch has been disengaged) range. Further, the upper side of the 45° straight line 113 in the first quadrant and the lower side of the same straight line 113 in the third quadrant are a range in which the shaft torque transmitted to the rear right wheel 15 is obtained through the differential apparatus 7 when the rear left wheel 13 is being skidding or idling. In the same way, the lower side of the 45° straight line 113 in the first quadrant and the upper side of the same straight line 113 in the third quadrant are a range in which the shaft torque transmitted to the rear left wheel 13 is obtained through the differential apparatus 7 when the rear right wheel 15 is being skidding or idling. The lines 115(R), 117(L), 119(L) and 121(R) represent transfer ratios of the torque sensitive type differential limiting means. Further, the lines 123(R), 125(L), 127(L) and 129(R) represent the overall differential limiting characteristics including the differential limiting force obtained by the viscous coupling 111.

In the above-mentioned torque sensitive type differential limiting means of the differential apparatus 7, the frictional resistance between the pinion gears 63L and 63S and the casing body 31 (in the pinion housing bores 61L and 61S) is determined equal to each other both when the left side gear 37 rotates faster than the right side gear 39 and when the right side gear 39 rotates faster than the left side gear 37. In addition, the sliding frictional resistance of each of the helical pinion gears 63L and 63S generated by thrust force between two helical pinion gears is also determined equal to each other on both the end surfaces thereof. Accordingly, the differential limiting force of the differential apparatus 7 is uniform on both left and right sides, with the result that the straight lines 115(R) and 117(L) are symmetrical with respect to the 45° straight line 113 and the lines 119 (L) and 121(R) are symmetrical with respect to the 45° straight line 113. Further, as already described, since the sliding resistance at the middle sliding portion 81 is determined larger than that at the end sliding portions 85 and 89, the transfer ratio $R_t$ (the straight lines 115(R) and 117(L)) at the frontward travel is larger than that Rt (the straight lines 119(L) and 121(R)) at the rearward travel. Further, since the viscous coupling 111 is of S(shaft)-S(shaft) type arrangement, the lines 123(R), 125(L), 127(L) and 129(R) including the differential limiting force by the viscous coupling are also symmetrical with respect to the 45° gradient straight line 113, without causing any asymmetrical limiting force on both left and right side of the rear wheels 13 and 15.

In the vehicle as shown in FIG. 2 again, when the rear left wheel 13 is idled during muddy road travel and thereby the left shaft torque is reduced down to $T_{L1}$ for instance, since the large shaft torque $T_{R1}$ is transmitted to the rear right wheel 15, the vehicle can be driven out of the muddy road. Under these conditions, since the differential limiting force is uniform on both the left and right sides, even if any of the wheels is being idled, the driving power transmitted to any of the wheels not being idled is uniform on both the sides of the wheels, thus improving the driving or steering characteristics and thereby the driving safety markedly. Further, since a large differential limiting force can be obtained in particular when the vehicle travels frontward, it is also possible to improve the stability of the vehicle body driven by a large torque, thus being more suitable for sporting vehicle drive.

In FIG. 4A, the gradients of the lines 123(R), 125(L), 127(L) and 129(R) are determined on the basis of the gradients of the lines 115(R), 117(L), 119(L) and 121(R), respectively. Therefore, the effects of the differential limiting force obtained by the viscous coupling 111 can be determined on the basis of the gradients of the lines 115(N), 117(L), 119(L) and 121(R), respectively. The effect of the viscous coupling 111 can be represented by a difference between an initial frontward travel torque $T_{iD}$ (an intercept point between the straight line 123(R) and the ordinate) and an initial rearward travel torque $T_{ic}$ (an intercept point between the straight line 129(R) and the ordinate). Here, these initial torques can be expressed as follows:

$$T_{iD}=T_{uc}(R_{iB}+1)$$

$$T_{ic}=T_{vc}(R_{ic}+1)$$

where $R_{iD}$ and $R_{ic}$ denote the gradients of the straight lines 123(R) and 129(R), respectively; and $T_{vc}$ denotes the torque of only the viscous coupling 111.

Since $R_{iD}>R_{iC}$, the following result can be obtained.

$$T_{iD}>T_{ic}$$

As described above, in the torque sensitive type differential limiting means according to the present invention, since the transfer ratio $R_t$ is different between the frontward and rearward travel, it is also possible to change the total differential limiting characteristics including the viscous coupling 111 between the frontward travel and rearward travel.

Figure 4B:
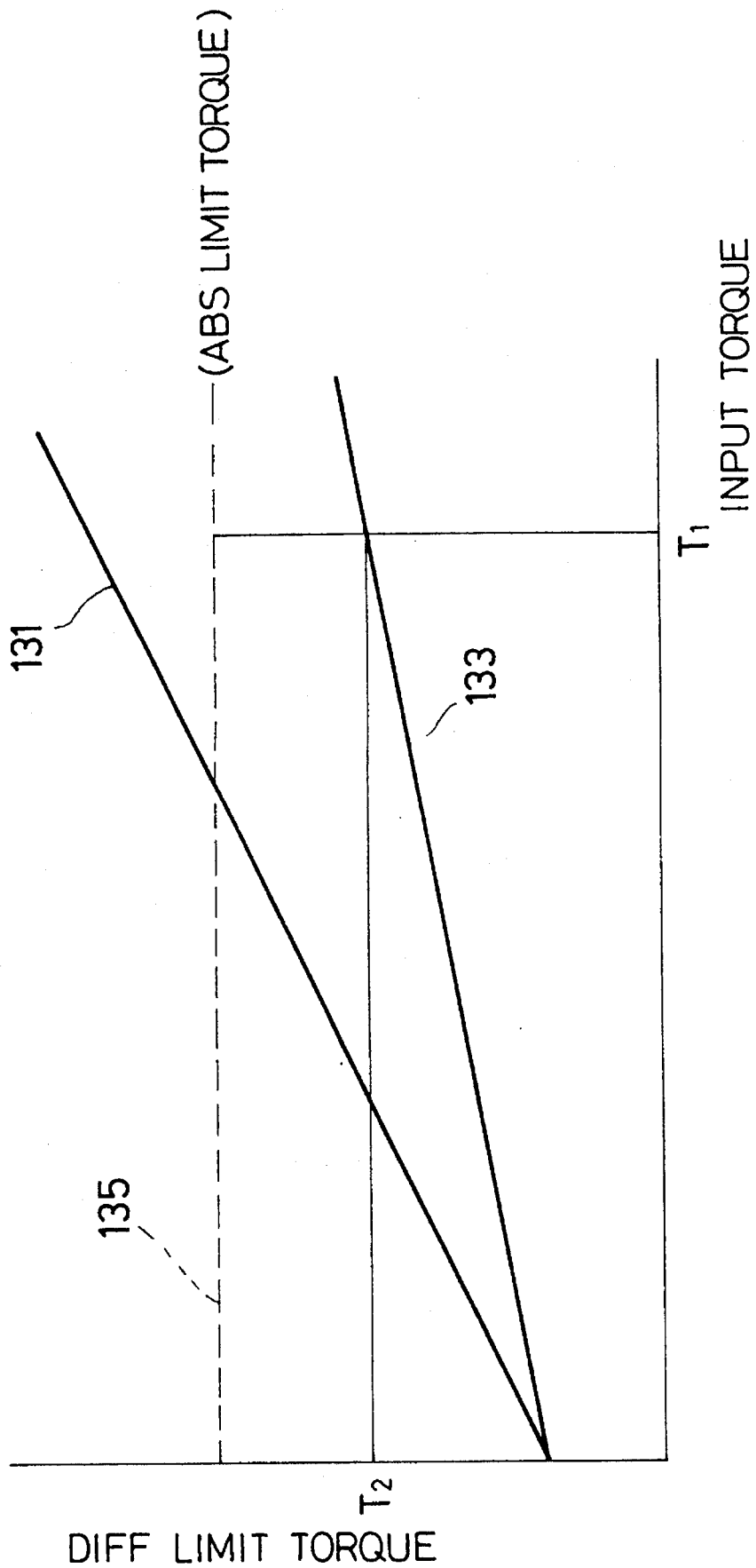
FIG. 4B is a graphical representation showing the relationship between the differential limiting torque and the input torque of the first embodiment of the differential apparatus shown in FIG. 3.

FIG. 4B shows the relationship between the differential limiting torque and the input torque. FIG. 4B indicates that the differential limiting force during the forward travel is increased as shown by the straight line 131 due to an increase of Rt of the lines 123 and 125 and further the differential limiting force during the rearward travel or engine brake travel is increased slightly as shown by the straight line 133 due to an decrease of $R_t$ of the straight lines 127(L) and 129(R). Further, the dashed straight line 135 represents a limit torque required for an ABS (antilock brake system). If the maximum input torque during engine brake travel is $T_1$, since the differential limiting torque $T_2$ at this maximum input torque $T_1$ will not exceed the ABS limit torque, it is possible to prevent the interference between the ABS limit torque 135 and the differential limiting torque $T_2$.

As described above, the differential apparatus 7 according to the present invention provides torque sensitive type differential limiting means which can generate differential limiting force uniform in the transfer ratio with respect to both the right and left wheel shafts, in addition to the speed sensitive type viscous coupling of S-S arrangement. Therefore, since it is possible to obtain total differential limiting characteristics symmetrical for both right and left wheel shafts, the vehicle steering and safety characteristics can be improved markedly. Further, since the transfer ratio of the torque sensitive differential limiting means can be easily determined to be large during the frontward travel and small during the rearward travel, it is possible to obtain a large differential limiting force during the frontward travel and further to prevent the interference with the ABS limit torque during engine brake travel, even when the viscous coupling 111 is actuated under symmetrical conditions. In addition, there exists such an advantage that the axial length of the wheel shaft is equal to each other on both the sides of the vehicle.

Figure 5C:
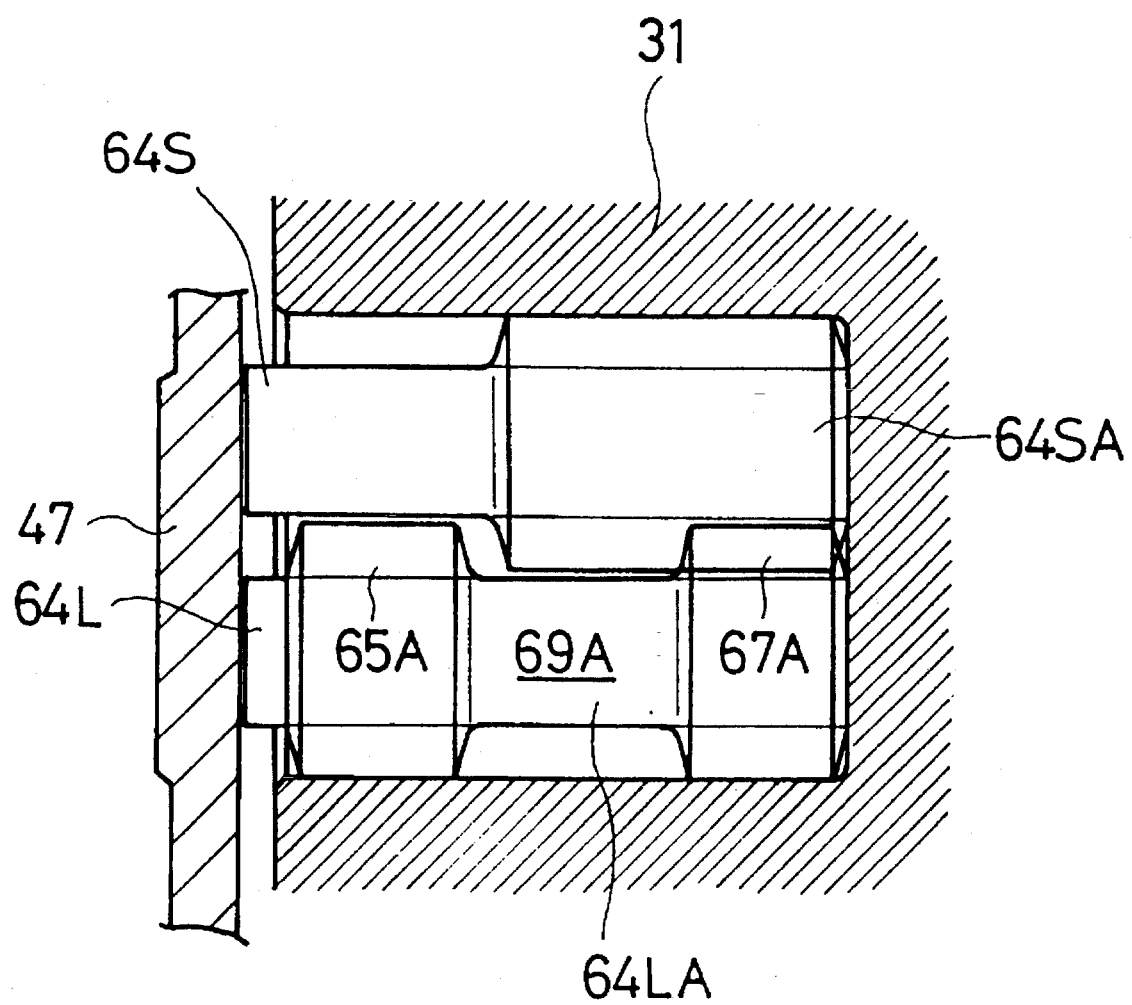
FIG. 5C is an development view showing two long and short pinion gears in mesh with each other.

FIGS. 5A to 5C show a modification of the first embodiment of the differential apparatus 7A according to the present invention, in which only the long and short pinion gears are different from those of the first embodiment 7.

As shown in these drawings, each of the long pinion gears 63LA is formed with a boss portion 64L, and each of the short pinion gears 63SA is formed with another boss portion 64S, respectively. Further, in this modification, the pinion gear housing bores 61LA and 61SA are all formed on the left end surface of the casing body 31 in the same depth, respectively. Therefore, both the long and short pinion gears 63LA and 63SA are located between the inner wall surface of the casing body 31 (on the right side) and the side surface of the flange portion 47 of the left side gear 37 (on the left side), respectively, as shown in FIG. 5C.

In this modification, since the axial lengths of both the pinion gear housing bores 61LA and 61SA are equal to each other, it is possible to obtain these gear housing bores by a single boring processing, thus reducing the machining steps for reduction of the manufacturing cost thereof.

Figure 6A:
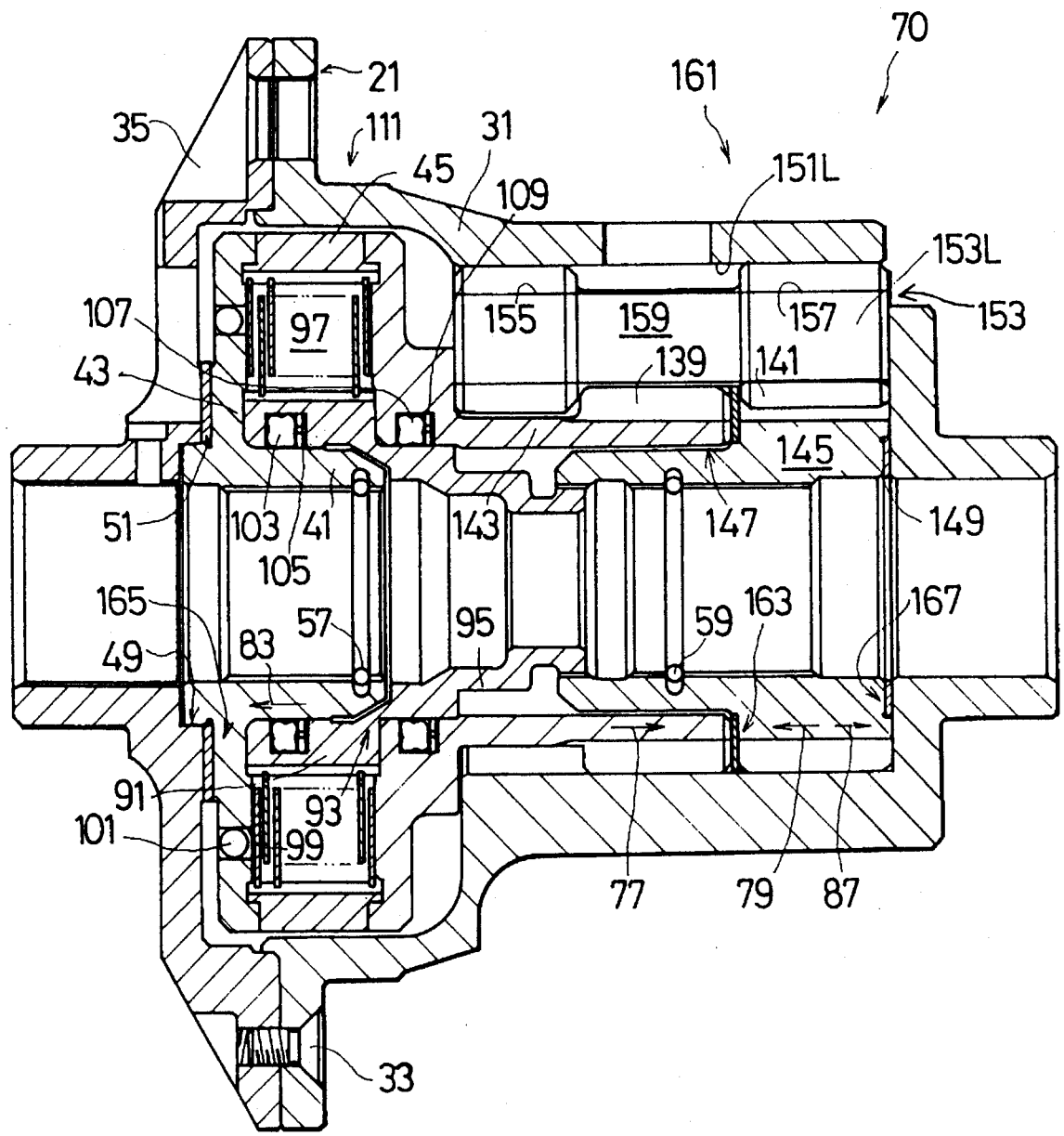
FIG. 6A is a cross-sectional view showing a second embodiment of the differential apparatus according to the present invention, in which a long pinion gear is shown.
Figure 6B:
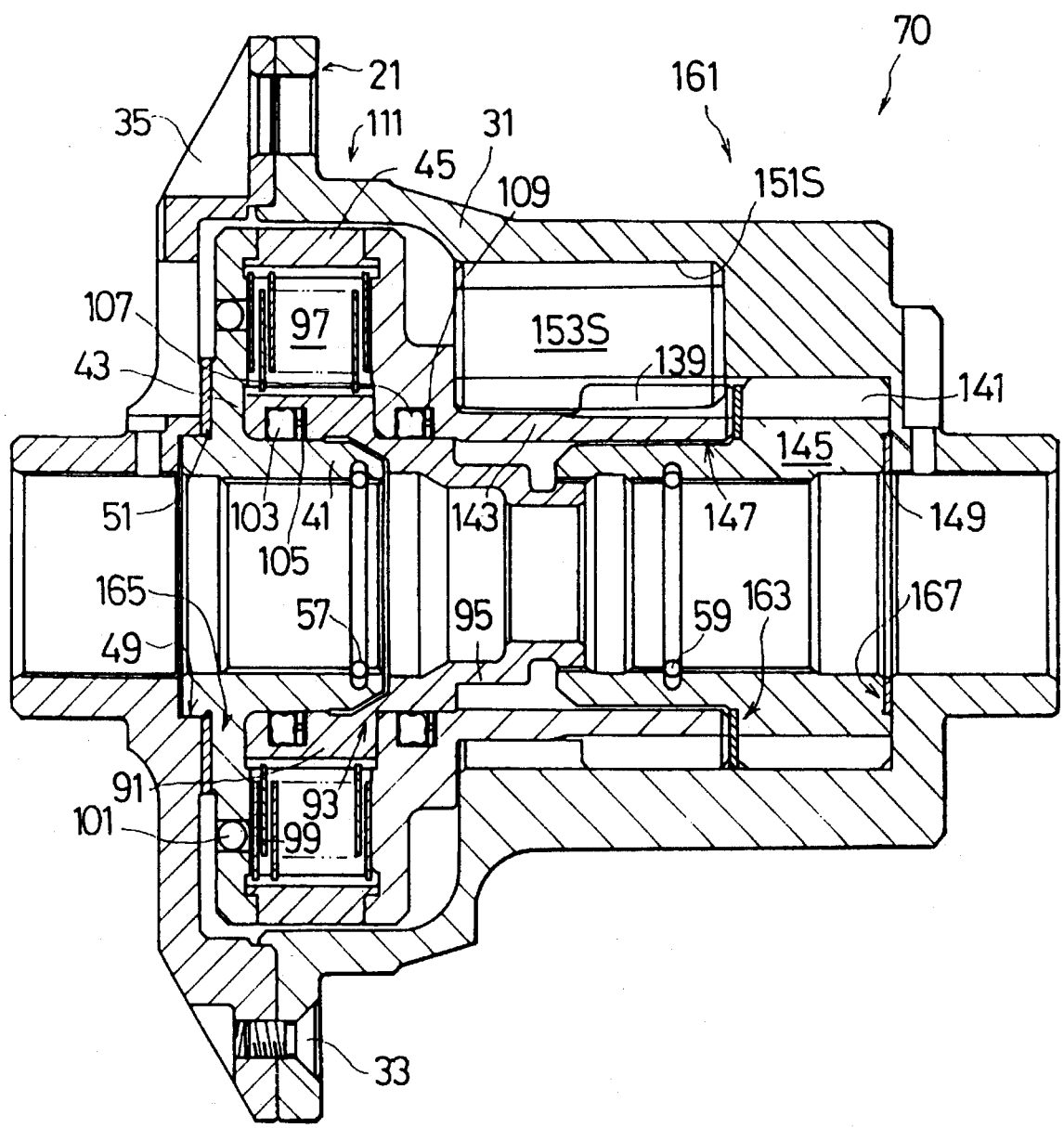
FIG. 6B is a cross-sectional view showing the second embodiment of the differential apparatus according to the present invention, in which a short pinion gear is shown.

The second embodiment of the differential apparatus according to the present invention will be described hereinbelow with reference to FIGS. 6A to 6D. In this embodiment, only the gearing positions between the two long and short pinion gears are different from those of the first embodiment. In FIGS. 6A to 6B, the same reference numerals have been retained for similar parts or elements which have the same functions as with the case of the first embodiment.

The differential apparatus 70 is roughly composed of a differential casing 21, a differential gear mechanism 161 including a link mechanism 153, and a viscous coupling 111. The differential casing 21 is composed of a casing body 31 and a cover 35 fixed to this casing body with screws 33. The differential gear mechanism 161 is composed of a pair of left and right side gears 139 and 141 (a differential gear) and the linking gear mechanism 153 composed of a plurality of pairs of a long pinion gear 153L and a short pinion gear 153S. The viscous coupling 111 is disposed between the two left and right side gears 139 and 141. In more detail, within the differential casing 21, a pair of the left and right side gears 139 and 141 (differential gears) are rotatably arranged. A left hub 41 is disposed on the left side of the left side gear 139. A flange potion 43 of the left hub 41 is connected to the left side gear 139 by welding, for instance via a cylindrical member 45 and a middle hub 143. The left hub 41 is rotatably supported by a bearing portion 49 of the cover 35. A washer 51 is interposed between the flange portion 43 of the left hub 41 and the cover 35. The left hub 41 is spline-coupled with the rear left wheel shaft 9 and further retained with a retainer ring 57 for prevention of removal of the rear left wheel shaft 9 from the left hub 41.

On the other hand, the right side gear 141 is formed with a right hub 145. The middle hub 143 is supported by the right hub 145 or vice versa at each free end thereof (bearing portion) 147. Further, a washer 149 is interposed between the right hub 145 and the casing body 31. The right hub 145 is spline-coupled with the rear right wheel shaft 11 and further retained with another retainer 59 for prevention of removal of the rear right wheel shaft 11 from the right hub 45.

Figure 6C:
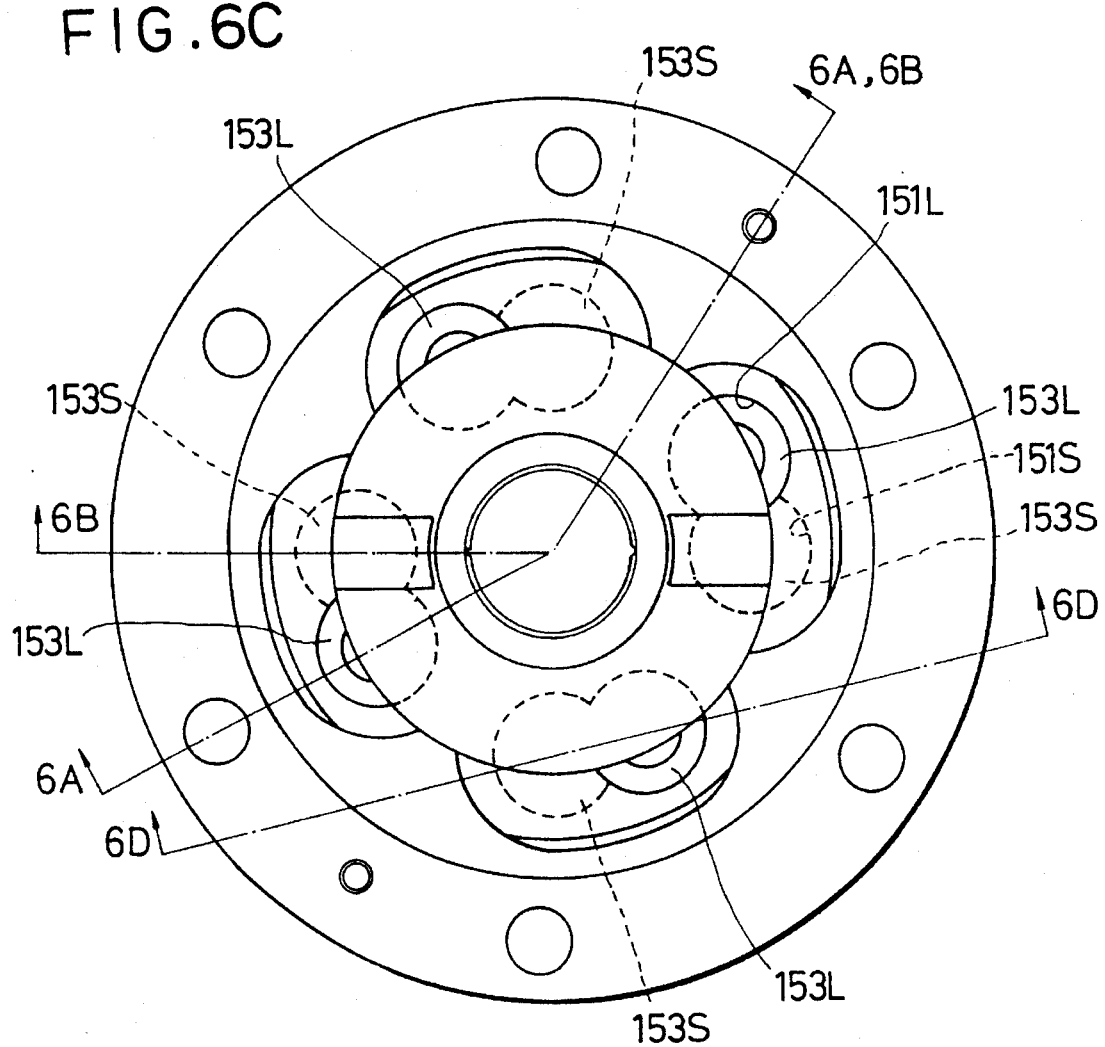
FIG. 6C is a side view showing a differential casing of the second embodiment thereof.

As shown in FIG. 6C, a plurality (e.g., four) of pairs of long pinion housing bore 151L and short pinion housing bore 151S are formed axially extending from the left side end surface of the casing body 31 so as to be arranged in the circumferential direction of the casing 21 in partially overlapped positional relationship with respect to each other. Each of the long pinion gears 153L is rotatably or slidably housed in each of the long pinion housing bores 151L, and each of the short pinion gears 153S is rotatably or slidably housed in each of the short pinion housing bores 151S, respectively.

Figure 6D:
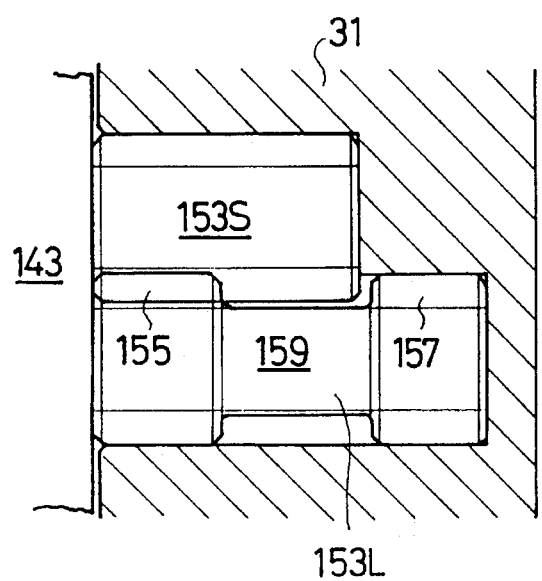
FIG. 6D is an development view showing two long and short pinion gears in mesh with each other.

The long pinion gear 153L is formed with a left gear portion 155, a right gear portion 157, and an intermediate shaft portion 159. The intermediate shaft portion 159 is small in diameter so as not to interfere with the left side gear 139, as shown in FIG. 6A. As depicted in FIG. 6A, the right gear portion 157 of the long pinion gear 153L is in mesh with the right side gear 141. Further, as shown in FIG. 6B, the short pinion gear 153S is in mesh with the right side gear 139. As depicted in FIG. 6D, the left gear portion 155 of the long pinion gear 153L is in mesh with the short pinion gear 153S. The left end surface of each of the long pinion gears 153L is in contact with the flange portion of the middle hub 143, and the left end surface of each of the short pinion gears 153S is also in contact with the flange portion of the middle hub 143, as shown in FIG. 3D. Further, the right end surface of each of the long pinion gears 153L is supported by an inner wall of the casing body 31, and the right end surface of each of the short pinion gear 153S is supported by an inner wall of the casing body 31, as shown in FIGS. 6A and 6B, respectively.

Accordingly, when the engine 1 is driven, engine power is transmitted to the differential casing 21 via the transmission 3 and the propeller shaft 5 to rotate the differential casing 21. The rotative power of the differential casing 21 is distributed to the left and right side gears 139 and 141, respectively. In more detail, the power of the differential casing 21 is transmitted to the right side gear 141 via the long pinion gears 153L and/or the short pinion gears 153S, and to the left side gear 139 via the long pinion gears 153L and/or the short pinion gears 153S. Once a difference in driving resistance is produced between two rear wheels 13 and 15, the engine power is differentially distributed to the left and right wheel shafts 9 and 11 via the differential gear mechanism 161 composed of a pair of left and right side gears 139 and 141 (differential gears) and the link gear mechanism 153 composed of a plurality of pairs of a long pinion gear 153L and a short pinion gear 153S.

The respective gears of the above-mentioned differential gear mechanism 161 and the link mechanism 153 are all of helical gear. The direction of these helical gears is as follows: when the differential casing 21 is rotated in the direction that the vehicle travels frontward, two thrust forces 77 and 79 of the two side gears 139 and 141 are generated in the directions that both side gears 139 and 141 are brought into contact with each other and slid relative to each other at a sliding portion (a washer) 163. On the other hand, when the differential casing 21 is rotated in the direction that the vehicle travels rearward, two thrust forces 83 and 87 of the two side gears 139 and 141 are generated In the directions that both side gears 139 and 141 are brought away from each other at a sliding portion 163; that is, the flange portion 3 of the left hub 41 is brought into contact with the washer 51 and slid relative to each other at a sliding portion 165 and further the right end surface of the right side gear 141 is brought into contact with the washer 149 and slid relative to each other at a sliding portion 167, respectively. In this embodiment, the frictional coefficient of the middle sliding portion 163 Is determined larger than that at the two side sliding portions 165 and 167. Therefore, the frictional resistance during the frontward travel is larger than that during the rearward travel. In addition, when the two thrust forces 83 and 87 are generated, the left end surfaces of the long pinion gears 153L are brought into contact with the flange portion of the middle hub 143 and slid relative to each other, and the right end surfaces thereof are brought into contact with the casing body 31 and slid relative to each other. Further, the left end surfaces of the short pinion gears 153S are also brought into contact with the flange portion of the middle hub 143 (see FIG. 6D) and slid relative to each other, and the right end surfaces thereof are brought into contact with the casing body 31 and slid relative to each other. The frictional coefficients at these sliding portions are determined to be equal to each other. In addition, the rotative frictional forces can be obtained between the long and short pinion gears 153L and 153S and the casing body 31 (in the pinion housing bores 151L and 151S), respectively.

Accordingly, the differential motion of the differential gear mechanism 161 of the side gears 139 and 141 and the link mechanism 153 of the respective pinion gears 153L and 153S can be limited by the sliding frictional forces generated at the respective sliding portions 163 or 165, 167, etc. and the rotative frictional forces generated between the respective pinion gears 153L and 153S and the casing body 31. The above-mentioned frictional resistance is proportional to the transmission torque of the differential gear mechanism 161, so that it is possible to regard that the respective sliding portions constitute differential limiting means of torque sensitive type or that the differential mechanism 161 and the link mechanism 153 are provided with the differential limiting function of torque sensitive type, respectively.

As described above, the differential apparatus 70 according to the present invention provides torque sensitive type differential limiting means which can generate differential limiting force uniform in the transfer ratio for both the right and left wheel shafts, in addition to the speed sensitive type viscous coupling of S-S arrangement. Therefore, it is possible to obtain total differential limiting characteristics symmetrical for both right and left wheel shafts, so that the vehicle driving or steering and safety characteristics can be improved markedly. Further, since the transfer ratio of the torque sensitive differential limiting means can be easily determined to be large during the frontward travel and small during the rearward coasting travel, it is possible to obtain a large differential limiting force during the frontward travel and further to prevent the interference with the ABS limit torque during engine brake travel, even when the viscous coupling 111 is actuated under symmetrical conditions. In addition, there exists such an advantage that the axial length of the wheel shaft is equal to each other on both the sides of the vehicle.

Figure 7:
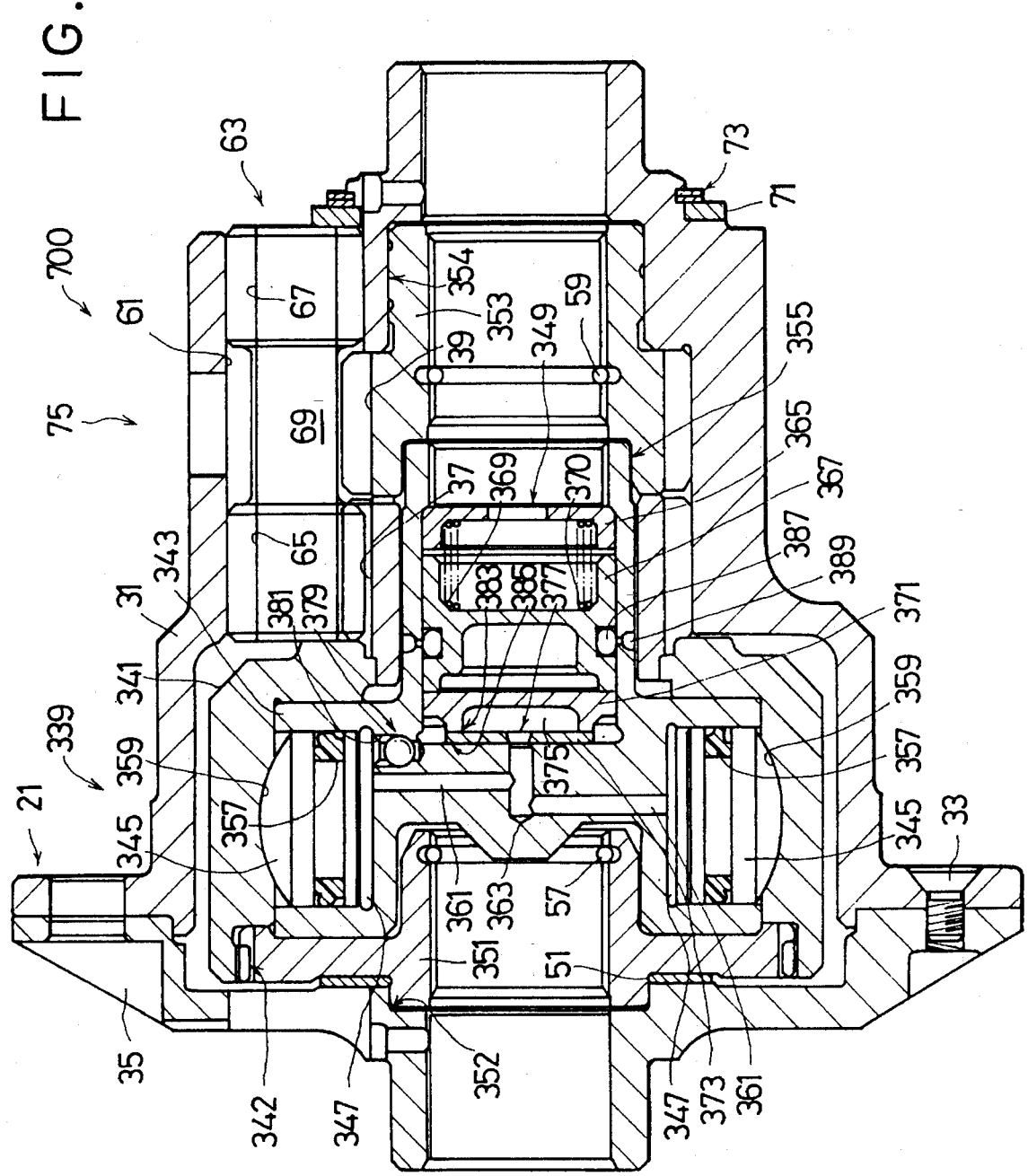
FIG. 7 is a cross-sectional view showing a third embodiment of the differential apparatus according to the present invention.

The third embodiment of the differential apparatus according to the present invention will be described hereinbelow with reference to FIG. 7. In this embodiment, only the coupling mechanism is different from that of the first an second embodiment. In FIG. 7, the same reference numerals have been retained for similar parts or elements which have the same functions as with the case of the first embodiment shown in FIGS. 3A and 3B.

In this third embodiment, the differential apparatus 700 comprises a differential gear mechanism 75 and an orifice coupling 339 of speed sensitive type, in stead of the viscous coupling 111 shown in FIG. 3A. The orifice coupling 339 is roughly composed of a cam casing 341, a rotor 343, pistons 345, a differential limiting force adjusting mechanism 349, etc.

The cam casing 341 is spline-coupled with a left hub 351 on the left side thereof at 342. Further, this left hub 351 is spline-coupled to the rear left wheel shaft 9 with a retainer 57 attached for prevention of removal of the rear left wheel shaft 9. A washer 51 is interposed between the left hub 351 and the cover 35. The hub 351 is supported by the bearing portion 352 of the cover 35. The inner surface of the cam casing 341 is formed with a plurality of cam surfaces 359 so as to be in contact with a plurality of pistons 345 (described later).

The rotor 343 is housed in the cam casing 341 so as to be rotatable relative to the cam casing 341. The rotor 343 is formed with a plurality of cylinders 347 extending radially outward at regular angular intervals. A hub portion of the rotor 343 extends from the left hub 351 to the right side gear 39. The rear right wheel shaft 11 is spline-coupled with both the right end of the rotor 343 and the right hub 353 formed with the right side gear 39 with another retainer 59 attached for prevention of removal of the rear right wheel shaft 11. The right end surface of the right hub 353 is supported by the casing body 31 at the bearing portion 354. The right free end of the hub portion of the rotor 343 is supported by the left free end of the hub 353 or vice versa at the bearing portion 355.

The rotor 343 is formed with a plurality of cylinders 347 extending outward in the radial direction. Each of the pistons 345 is engaged within each of the cylinders 347 via a sealing member 357, respectively. The outermost end surface of each of the pistons 345 is in contact with each of the cam surfaces 359 formed in the inner surface of cam casing 341. The cam profile of the cam surface 359 is formed in such a way that when the cam casing 341 and the rotor 343 are rotated in differential motion, the pistons 45 are moved radially inward simultaneously in the same phase. Further, the rotor 343 is formed with a plurality of radially extending oil passages 361 so that each of the cylinders 347 can communicate with a central axially extending oil passage 363.

The differential limiting force adjusting mechanism 49 is composed of a right retainer 365, a left retainer 67, two springs 369 and 370 interposed between the two retainers 365 and 367, a plate valve 371, an orifice plate 73. The orifice plate 373 is fixed to the rotor 343 with screws and so formed that the outer edge portion thereof can be deformed in the rightward direction in FIG. 7 whenever inner pressure within the central oil passage 363 rises. An oil accumulator 375 is formed between the plate valve 371 and the orifice plate 373. This oil accumulator 375 communicates with the central oil passage 363 via an orifice 377 formed in the orifice plate 373. The rotor 343 is further formed with another radially extending passage 381 for each of the cylinders 347 so that each cylinder 347 can communicate with the central oil passage 363 via a one-way valve 379, respectively. That is, oil passage 381 communicates with the central oil passage 363 via a gap 383 between the plate valve 371 and the orifice plate 373, the accumulator 375 and the orifice 377 or via a gap 385 between the rotor 343 and the orifice plate 373. The cylinders 347, the oil passages 361, 363 and 381 and the accumulator 375 are all filled with a hydraulic fluid. Here, the one-way valve 379 serves to prevent hydraulic fluid from flowing from the cylinder 347 to the central oil passage 363 through the gaps 383 and 385 directly. Since the plate valve 371 and the orifice plate 373 are urged by an elastic force of the two springs 369 and 370, the gaps 383 and 385 are opened only when the inner fluid pressure within the central oil passage 363 rises to some extent. Further, the rotor 343 is formed with a relief valve hole 389. This relief valve hole 389 is closed by a sealing member 387 disposed between the left retainer 367 and the rotor 343. Therefore, when oil pressure within the accumulator 375 rises excessively, since the right retainer 367 moves in the rightward direction, the valve hole 389 is opened for relieve of the accumulator pressure to the outside.

The operation of the orifice coupling 339 will be described hereinbelow. The cam casing 341 is connected to the rear left wheel shaft 9 and the rotor 343 is connected to the rear right wheel shaft 11. Therefore, when a differential rotation occurs between both the rear wheels 13 and 15, the outermost surfaces of the piston 345 are depressed radially inward by the cam surfaces 359 of the cam casing 341, so that the inner pressure within the cylinders 347 rises. Under these conditions, since the pistons 345 are urged against the cam surfaces 359 of the cam casing 341, the differential motion between the cam casing 341 and the rotor 343 is limited; that is, the differential motion between both the rear wheels 13 and 15 generated by the differential gear mechanism 75 can be limited. Here, since the inner pressure within the cylinders 347 is proportional to the number of differential revolutions, this differential limiting function is of speed sensitive type.

Further, since the inner pressure within the cylinders 347 can be regulated through the orifice 377, a pressure difference is produced between the cylinders 347 and the accumulator 375. When the inner pressure within the accumulator 375 increases with increasing number of differential revolutions beyond the elastic force of the springs 369 and 370, the hydraulic fluid begins to flow through the gap 383 into the oil passage 381. In addition, when the inner pressure rises, the hydraulic fluid begins to flow also through the gap 385 because the orifice plate 373 is deformed. Thus, the amount of hydraulic fluid returned from the central oil passage 363 and the accumulator 375 to the cylinder 347 through the oil passage 381 and the one-way valve 379 increases to reduce an increase rate of the differential limiting force.

In the case of the orifice coupling 339 according to the present invention provided with the adjustable orifice, the feature in comparison with the fixed orifice is as follows: When the inner pressure of the cylinders is low during a low differential speed, since the gaps 383 and 385 are both closed by the springs 369 and 370, it is possible to obtain a relatively large differential limiting force. However, when the inner pressure of the cylinders rises high during a high differential speed, since the gaps 383 and 385 are both opened against the springs 369 and 370, is possible to appropriately suppress an increase of the differential limiting force. Therefore, it is possible to obtain the preferable differential limiting characteristics whose limiting force changes linearly or in proportion to the differential speed in a wide differential speed range. In addition, even if the differential speed is zero, an appropriate differential limiting force can be obtained by the centrifugal force of the pistons 345 against the inner surface of the cam casing 341. Further, the differential limiting force can be adjusted easily by changing the elastic force of the springs 369 and 370.

As described above, in the third embodiment of the differential apparatus 700, the orifice coupling 339 is interposed between the rear left wheel shaft and the rear right wheel shaft in S-S arrangement type. That is, the rear left wheel shaft 9 is connected to the left side gear 37 via the left hub 351 and the cam casing 341; and the rear right wheel shaft 11 is connected to the right side gear 39 via the left hub 353 and the rotor 343. Therefore, it is possible to obtain the differential apparatus provided with both torque and speed sensitive differential limiting function by the differential gear mechanism 75 and the orifice coupling 339 in combination, which are uniform both during vehicle frontward and rearward travels. Further, since the differential limiting force can be increased during vehicle frontward travel and decreased during vehicle rearward coasting travel, it is possible to improve the vehicle driving or steering characteristics in sporting feeling. Further, it is possible to prevent the interference with the ABS (antilock braking system) when the engine is being braked. Furthermore, since the rotor 343 of the orifice coupling 339 is extended to the rightward direction so as to be connected to the rear right wheel shaft 11, it is possible to equalize the lengths of both the rear wheel shafts 9 and 11.

As described above, in the differential apparatus according to the present invention, a torque sensitive type differential gear mechanism is arranged on one side of the differential casing, and the speed sensitive type coupling is arranged on the other side of the differential casing. Since the frictional resistance of the differential gear mechanism changes according to the contact pressure at each of the contact surfaces; that is, the torques of the two side gears connected to the two wheel shafts, respectively, it is possible to generate torque sensitive differential limiting force between the two wheel shafts In the uniform conditions on both sides when any one of the wheel shafts is being idled. Further, when the helical gears are used, it is possible to change the magnitude of the differential limiting force according to the vehicle travel direction (forward or rearward). In addition, since the viscous or orifice coupling is interposed between the two wheel shafts in shaft-shaft arrangement manner via the hubs, it is also possible to generate speed sensitive differential limiting force in the same uniform conditions as with the case of the torque sensitive differential limiting force.

Further, in the differential apparatus according to the present invention, since the hubs are arranged appropriately, it is possible to equalize the axial lengths of the right and left wheel shafts.

What is claimed is:

1. A differential apparatus interposed between a first shaft and a second shaft, the apparatus comprising:

a differential casing;

a first side gear rotatably arranged within said differential casing and connected to the first shaft;

a second side gear rotatably arranged within said differential casing in parallel to said first side gear and connected to the second shaft;

at least one short pinion gear rotatably supported in said differential casing and disposed radially outward said first and second side gears;

at least one long pinion gear rotatably supported in said differential casing in parallel to and in mesh with said short pinion gear and disposed radially outward of said first and second side gears;

said first and second side gears being geared to each other through said short and long pinion gears so as to be rotated differentially relative to each other, when said short and long pinion gears are driven by said differential casing;

a working chamber formed between a cylindrical member having a first hub spline-coupled to said first shaft and a second hub spline-coupled to said second side gear, said second hub extending between said first hub and said first side gear; and coupling means interposed between said first shaft and said second shaft, for limiting a relative rotation of said first and second shafts by a working fluid filling said working chamber when said cylindrical member is relatively rotated with respect to said second hub.

2. A differential apparatus interposed between a first shaft and a second shaft, the apparatus comprising:

a differential casing;

a first side gear rotatably arranged within said differential casing and connected to the first shaft;

a second side gear arranged adjacent to said first side gear in parallel to said first side gear and connected to the second shaft, said second side gear having a diameter equal to that of said first side gear;

at least one short pinion gear rotatably supported in said differential casing and disposed radially outward of said first and second side gears;

at least one long pinion gear rotatably supported in said differential casing in parallel to said short pinion gear, said long pinion gear being arranged so as to mesh with said short pinion gear at least adjacent to one end of one of said first and second side gears, said first and second side gears being geared to each other through said short and long pinion gears so as to be rotated differentially relative to each other, when said short and long pinion gears are driven by said differential casing;

a working chamber formed between a cylindrical member connected to the first shaft and a hub connected to the second shaft; and coupling means interposed between said first shaft and said second shaft, for limiting a relative rotation of said first and second shafts by a working fluid filling said working chamber when said cylindrical member is relatively rotated with respect to said hub.

3. A differential apparatus of claim 1 or 2, wherein at least one of said short and long pinion gears comes into contact with a housing of said coupling means.

4. A differential apparatus of claim 2, wherein said coupling means is disposed on one end of said first and second side gears and a meshing portion of said short and long pinion gears is disposed on the other end of said first and second side gears.

5. A differential apparatus interposed between a first shaft and a second shaft, the apparatus comprising:

a differential casing;

a first side gear rotatably arranged within said differential casing and connected to the first shaft;

a second side gear rotatably arranged within said differential casing in parallel to said first side gear and connected to the second shaft;

at least one short pinion gear rotatably supported in said differential casing and around said first and second side gears;

at least one long pinion gear rotatably supported in said differential casing in parallel to and in mesh with said short pinion gear and radially outward of said first and second side gears;

said first and second side gears being geared to each other through said short and long pinion gears so as to be rotated differentially relative to each other, when said short and long pinion gears are driven by said differential casing;

a working chamber formed between a cylindrical member having a first hub spline-coupled to said first shaft and a second hub spline-coupled to said second side gear, said second hub extending between said first hub and said first side gear; and a plurality of resistance plates engaged with the cylindrical member in juxtapositional relationship with respect to each other;

a plurality of resistance plates engaged with the second hub in juxtapositional relationship with respect to each other alternately between the first resistance plates engaged with the cylindrical member; and a working fluid filling said working chamber.

* * * * *